Nov. 16, 1965  G. CANNELLA  3,217,896
SELF-ELEVATING BUILDING CRANE
Filed Nov. 6, 1962  11 Sheets-Sheet 2

INVENTOR.
GASPARI CANNELLA
BY
ATTORNEY

INVENTOR.
GASPARI CANNELLA
BY S.C. Juter
ATTORNEY.

INVENTOR.
GASPARI CANNELLA

ATTORNEY

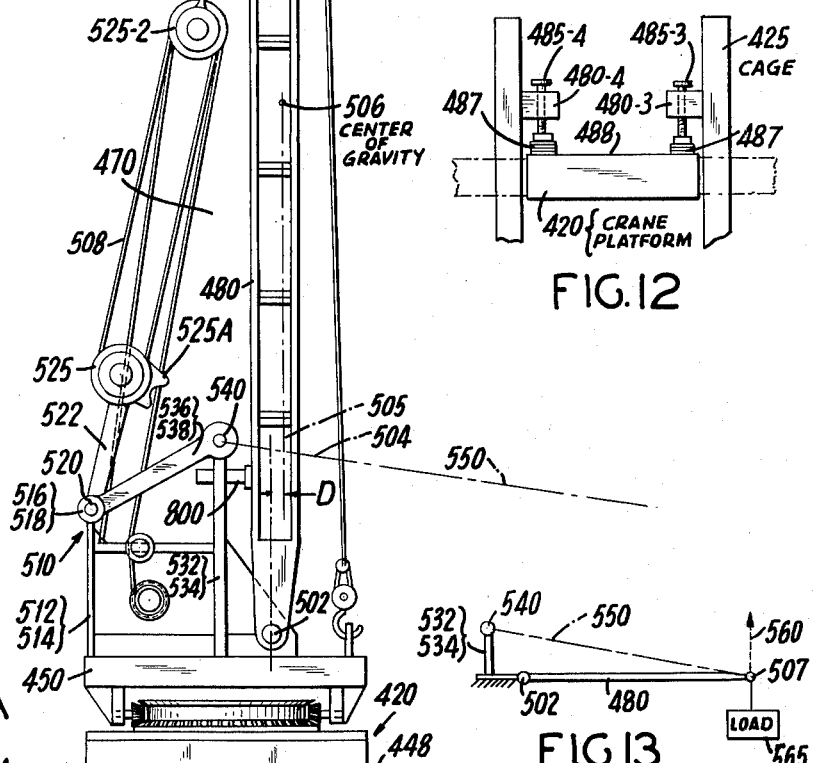

Nov. 16, 1965  G. CANNELLA  3,217,896
SELF-ELEVATING BUILDING CRANE
Filed Nov. 6, 1962  11 Sheets-Sheet 10

INVENTOR.
GASPARI CANNELLA
BY
ATTORNEY.

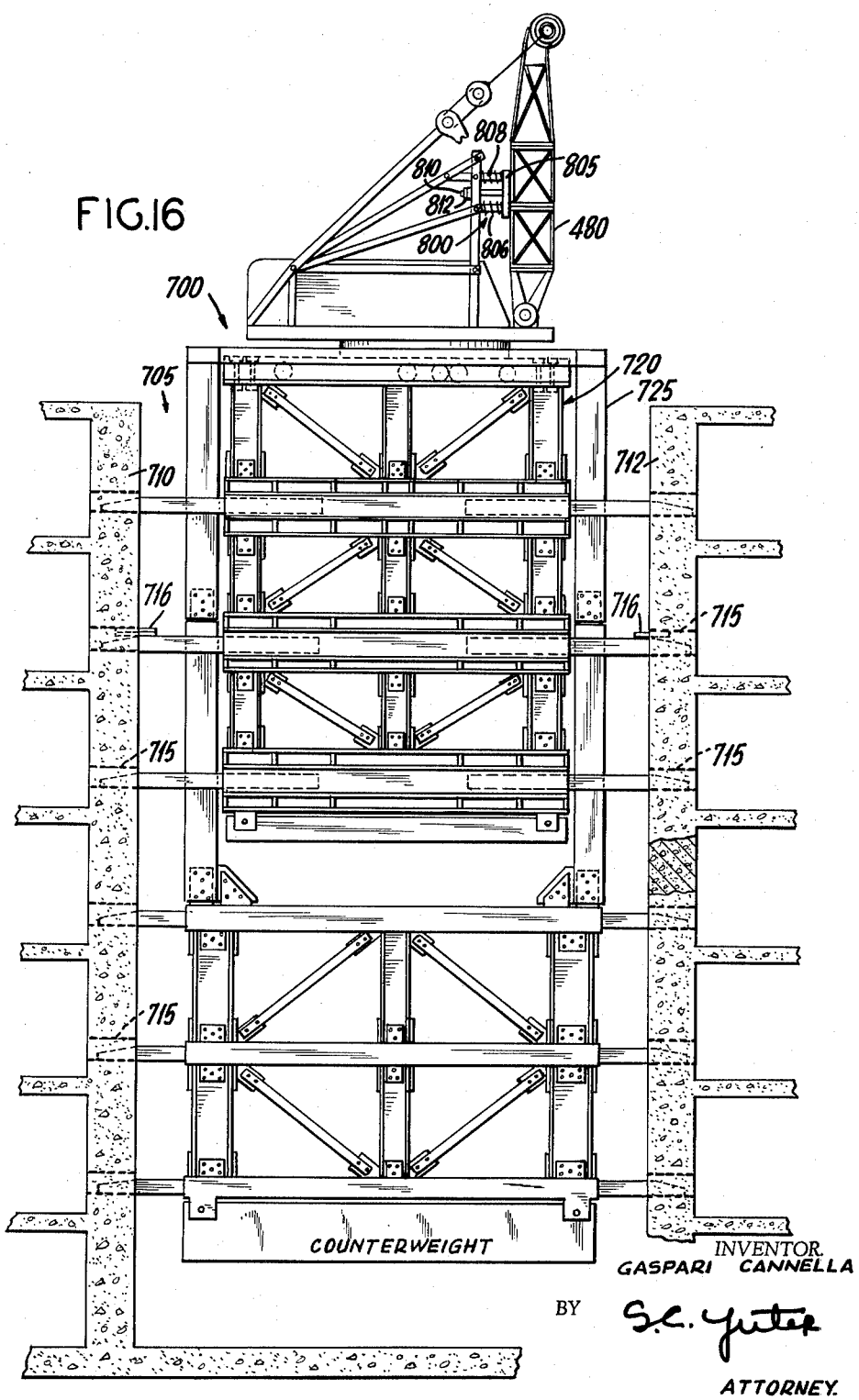

3,217,896
SELF-ELEVATING BUILDING CRANE
Gaspari Cannella, 7903 Sutter Ave., Ozone Park, N.Y.
Filed Nov. 6, 1962, Ser. No. 235,812
32 Claims. (Cl. 212—64)

This invention relates to cranes, and particularly to elevator cranes, that is, cranes with suitable elevator equipment by means of which a crane and its related equipment may be raised to a desired level, relative to an associated structural frame work of a building, as the framework is being progressively erected for such building.

The primary object is to provide an elevator crane which can utilize the structural framework of a building, as the framework is being progressively erected, to place the usual supporting rotary table for the crane boom on the structural framework of the building with such framework serving as a base support for the crane.

When tall buildings with metal framework are to be erected, the progressive construction of the structural framework for the building requires periodically that certain heavy columns, girders and beams be erected and placed, and then held in position for proper joining to the already-erected parts of the structural framework, by suitable means, such as rivets or by welding operations.

It has been customary to position a crane on the ground adjacent the area to be covered by the structural framework of the building, and to utilize such crane for raising the structural members to the required positions for assembly on and into the framework as it is being progressively erected. From its very nature, the crane and its large boom must take up a great deal of space outside of the area on which the building is to be erected. The truck that carries the crane must serve as its supporting base. In order to support the boom properly, the heavy truck must be supplemented by many extending arms or outriggers to enlarge the base within which the crane may safely operate. The total base area thus taken up by the truck and the outriggers will practically close the street to traffic so long as the truck must be kept in that street area to support and operate the crane.

In accordance with the present invention, the structural framework of a building, as it is being progressively erected, is utilized as the base upon which to support the crane. As the construction of the framework gradually rises, the crane with its base support is correspondingly elevated with and to the progressively rising top level of the structure to enable the crane to swing freely in azimuth over a radius corresponding substantially to the full length of the boom. An elevator cage serves to raise or lower the crane, as desired.

In any building there will be one or more vertical spaces that are essentially air shafts in which free movement may be had up or down along a central axis. Such air shafts may be for ultimate use as elevator shafts in the building, or for other purposes. For the purpose of the present invention, it is sufficient that an air shaft be available of sufficient sectional area to accommodate the supporting cage that is used to carry the crane and its platform to a selected rest and work position.

The cage and the crane platform are constructed to permit free relative movement between them in either direction, up or down along a vertical axis. Either the cage or the crane platform can be anchored on the framework and the other can be relatively moved.

The cage is provided with extensible telescoping outrigger beams which may be extended from the side wall edges of the cage as cantilever beams so their outer extended ends can rest on a side beam or girder of the structural framework of the building if the framework is made of metal.

When the structural framework of the building is of concrete, a modified arrangement of cantilever beams is employed with support derived from the vertical concrete columns, instead of from the concrete beams or girders. Auxiliary metal cross-beams, termed "jumping beams" in the art, are utilized between columns, when necessary, to provide support between the columns when the location of a column is not convenient to receive a cantilever beam directly, since the concrete beams are not to be used for support of weights of the amount involved in the crane and its load.

The platform for the crane is supported within the cage to permit relative vertical movement up or down with respect to the cage, as previously stated. That platform, similarly, is also provided with extensible telescoping beams which can be extended outwardly from the platform structure, and through open spaces in the cage, to project over the top of a selected beam or girder, or to the concrete columns, to enable such extended cantilever beam to serve as an outrigger support on the selected girders or columns of the structural framework of the building, so the platform can serve as a fixed support while the cake is being re-positioned in the progressive step-wise movement up or down, for subsequent re-positioning of the platform.

In the case of a concrete framework, the "jumping beams" are utilized when necessary, and the actual ultimate support is derived from the concrete columns for the platform, in the same manner as for the cage.

In either case, whether the cage is anchored, or the crane platform is anchored, cable hoisting apparatus is provided to raise or to lower the other free member, that is, the platform or the cage.

An important object of the invention, and one of the special features thereof, as disclosed herein, is to provide a simple and effective apparatus for utilizing the cage, when it is supported in fixed position, to serve as a reaction base against which the platform and its supported crane may be moved upward or downward for positioning the crane at a desired and selected level.

A further object of the invention is to provide a suitable construction of the cage and the crane platform with interrelated control apparatus for utilizing the crane platform as a reaction support for re-locating the cage at a different level, at which the cage may then be utilized as a reaction support for a subsequent operation for shifting the platform and its crane to another desired position.

At each stage of the shifting operation for the crane and its platform, when the cage is to serve as the reaction support, the cantilever outrigger beams of the cage will be extended to seat on the structural framework. The outrigger beams of the platform are at that time retracted into their appropriate housings to be out of the way and to avoid any interference with the structural framework when the crane platform is moved vertically up or down with respect to the cage.

While the cage is thus anchored in place, the crane platform may be raised or lowered with respect to the cage. To accomplish that, suitable cables are provided, each anchored at one end to a top corner of the cage and threaded through a series of power sheaves and guide pulleys and then anchored at the other end on a drum on which the cable is disposed to be wound and collected as on a winch. The drum is rotatably supported in bearings anchored on the platform for the crane. One cable is provided between each corner of the cage and a corresponding corner of the platform. The sheaves and guide pulleys provided for each cable between the anchor point on the cage and the anchor point on the winch-like drums enable the cables to raise or lower the platform while maintaining its horizontal stability.

Thus, by means of such top cable arrangement from the top corners of the cage to the appropriate drums adjacent the corners of the platform, the cable may be wound on and accumulated on the drums, to raise the platform and the crane relative to the anchored cage, or the cable may be played out and reeled off the drums, all in corresponding equal increments of length, to lower the platform and its supported crane relative to the anchored cage.

When the crane platform is to be elevated to a still higher level beyond the level possible with the cage in its then position, the crane platform is first supported on the building frame work by suitable outriggers, and then the cage is elevated to a higher resting position on the framework, from which the position of the crane and the platform may again be shifted upward.

In order to elevate the cage to a higher position, the crane platform is first moved to a position at which the platform outrigger beams may be freely extended to rest on top of suitably selected girders, or on concrete columns, as explained, to support the platform and the crane independently of the cage. Then the cage may be freely shifted to another position, up or down, at which position the cage will be anchored to then serve to provide a new location of the reaction base for adjustably re-positioning the platform and the crane.

Just as a cable and drum arrangement was utilized before to raise the movable platform while the cage was held anchored, the same set of cable and drum assemblies serves to raise the cage when the platform is anchored. The platform then serves as a reaction base to support the drums which reel in the cable whose lower outer ends are secured to the bottom corners of the cage. Thus, the cage is raised toward the anchored platform.

Thus, when the cage is to be raised, with the platform anchored, the cage drums are rotated to accumulate the bottom cables in order to pull upwardly on the bottom corners of the cage, to raise the cage to a new desired height.

Thus, by means of the cables and drums, when the cage is stationary in anchored position, rotation of the drums to accumulate cable on the drums serves to raise the platform and the crane. Rotation of the drums to release cable serves to lower the platform and the crane to a desired level. At either such selected level, the outrigger beams on the crane platform may then be extended to rest on the corresponding girders or columns of the structural framework. The cable drums are driven by suitable driving means such as gas engines or electric motors, to enable the drums to be rotated and inched gradually to permit the platform and its heavy crane to be lowered gradually and carefully on the selected girders or columns of the building structure.

In similar manner, when the platform is stationary, the cage cable drums may be driven and rotated to accumulate cable, anchored at one end to the cage, so the accumulated cable will raise the cage to the position desired. Conversely, when the cable is played out, the cage will be lowered to the position desired.

By thus supporting and essentially anchoring the crane platform on the structural framework of the building as the framework is being erected, the crane and all of its equipment is located in space that is otherwise not being used or utilized. The usual crane truck with its outrigging supports for the crane is not necessary. Traffic space is not occupied which is otherwise needed for access to the building to bring in supplies and materials for the erection operations.

As previously indicated, when the structural framework is of metal, the cage and the platform may be supported on the horizontal beams and girders. Where the structural framework is of concrete, the vertical columns are used for support.

A feature of the invention is the provision of sleeves disposed to be anchored in the columns when the concrete is poured, so the sleeves will be available to receive supporting brackets and to withstand and distribute the stresses of the weight pressures imposed on the brackets by outriggers from the cage or from the crane platform or from auxiliary jumping beams employed to provide beam type support where columns are not in appropriate locations to receive the outrigger beams directly on the column brackets.

In order that a crane of this type may be available for use over a maximum equivalent ground or floor area of the building, the boom should be operable at full radial distances from its base pivot point. The boom is anchored on a conventional rotary platform. In order to maintain an angle between the boom and the hoist cable line, to be able to establish a lifting force at the load end of the boom, a high gantry is provided on the rotary platform to limit the declination of the bottom hoist cable sheave to a level above the level of the pivot area for the lower end of the boom.

Another object of the invention, therefore, is to provide a crane construction embodying a high gantry with a boom hoist cable and sheave arrangement that will permit the boom to be lowered to horizontal position and still provide an angle between the boom hoist line and the boom.

Another object of the invention is to provide a crane of the type herein with a supporting structure that may be arranged to support the crane and its platform on supports at several floor levels.

Another object of the invention is to provide a cage of the type herein with a counterweight that will co-operate with the cage to establish an increased pressure anchoring force on the crane platform.

The foregoing objects and other objects and features of the invention as well as the general arrangement and construction of the elevator crane and its components for use in steel structural framework or in concrete structural framework are shown in two modifications, and the manner in which they are operated is described in the following specification taken in connection with the accompanying drawings, in which.

Figure 5:
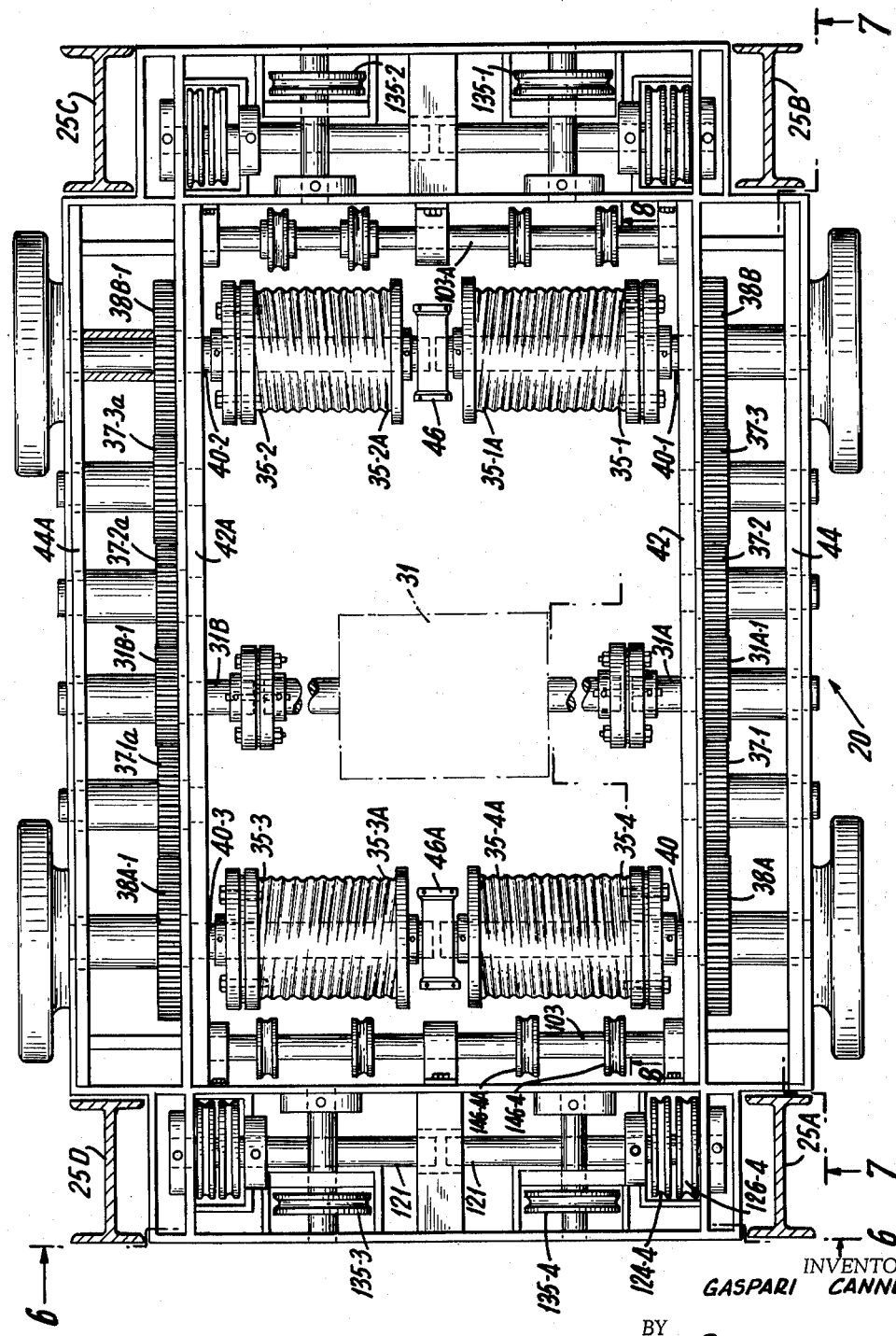
Figure 6:
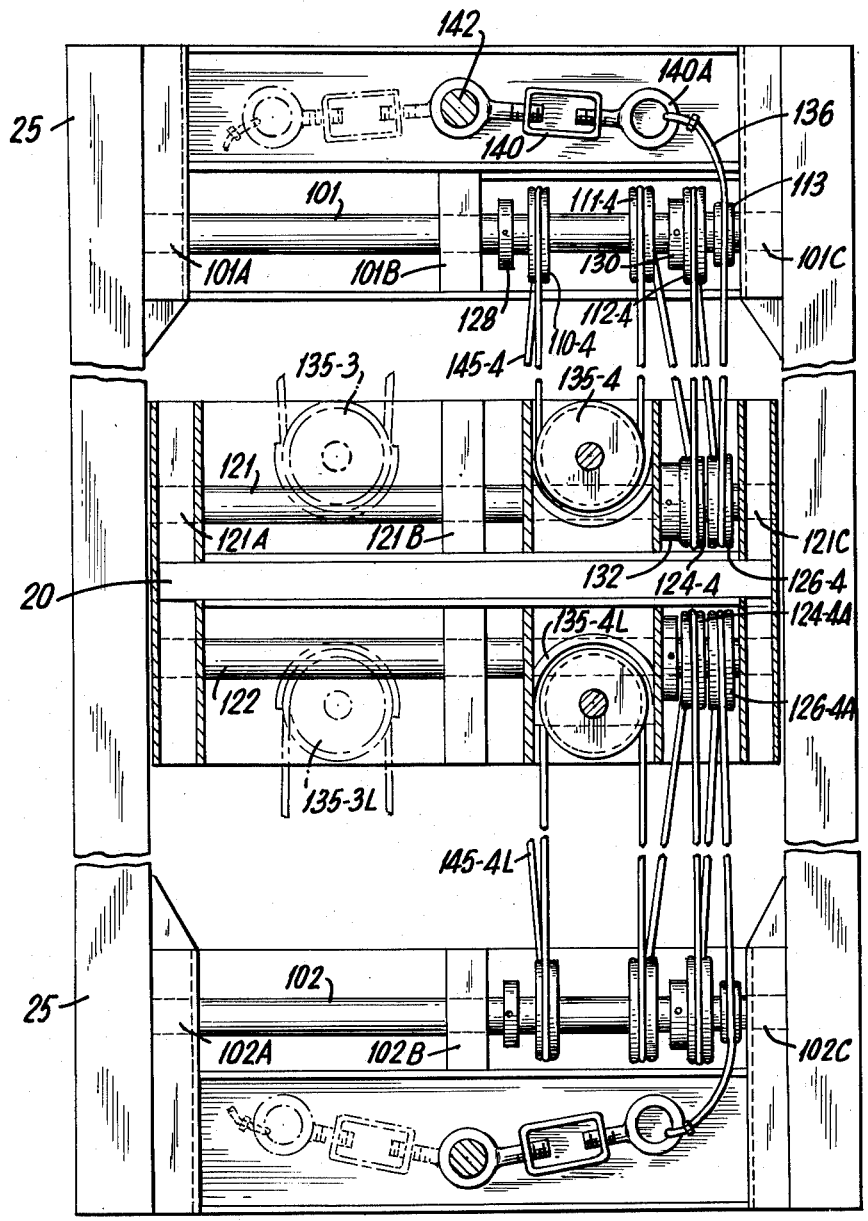
Figure 7:
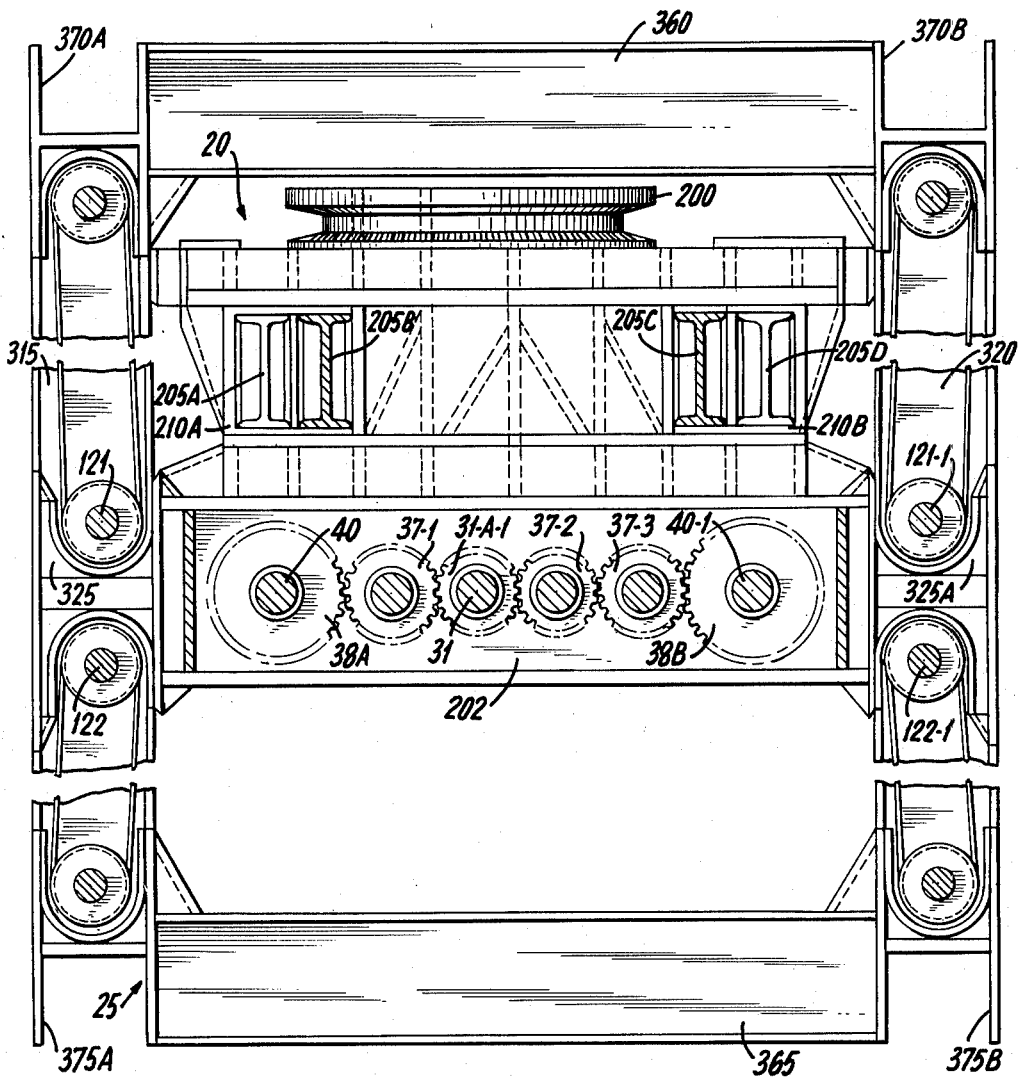
Figure 8:
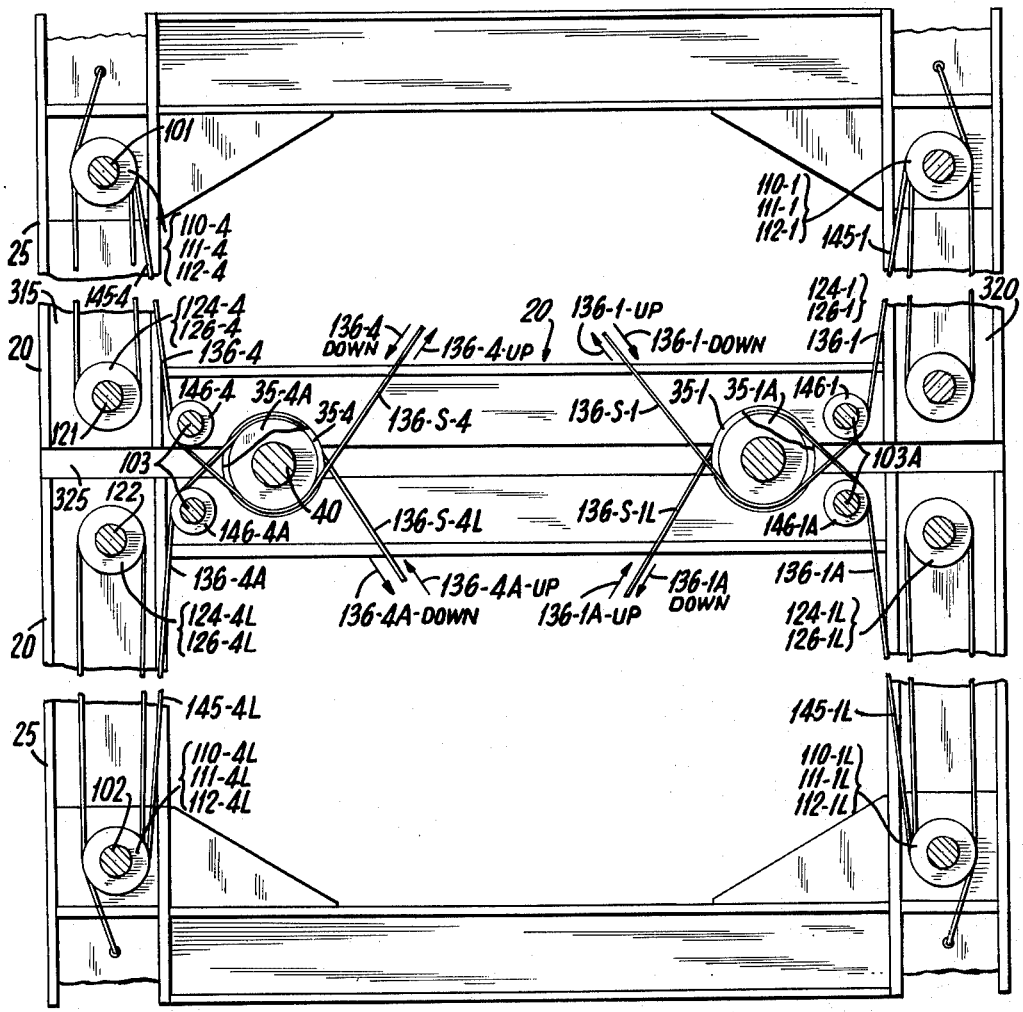
Figure 9:
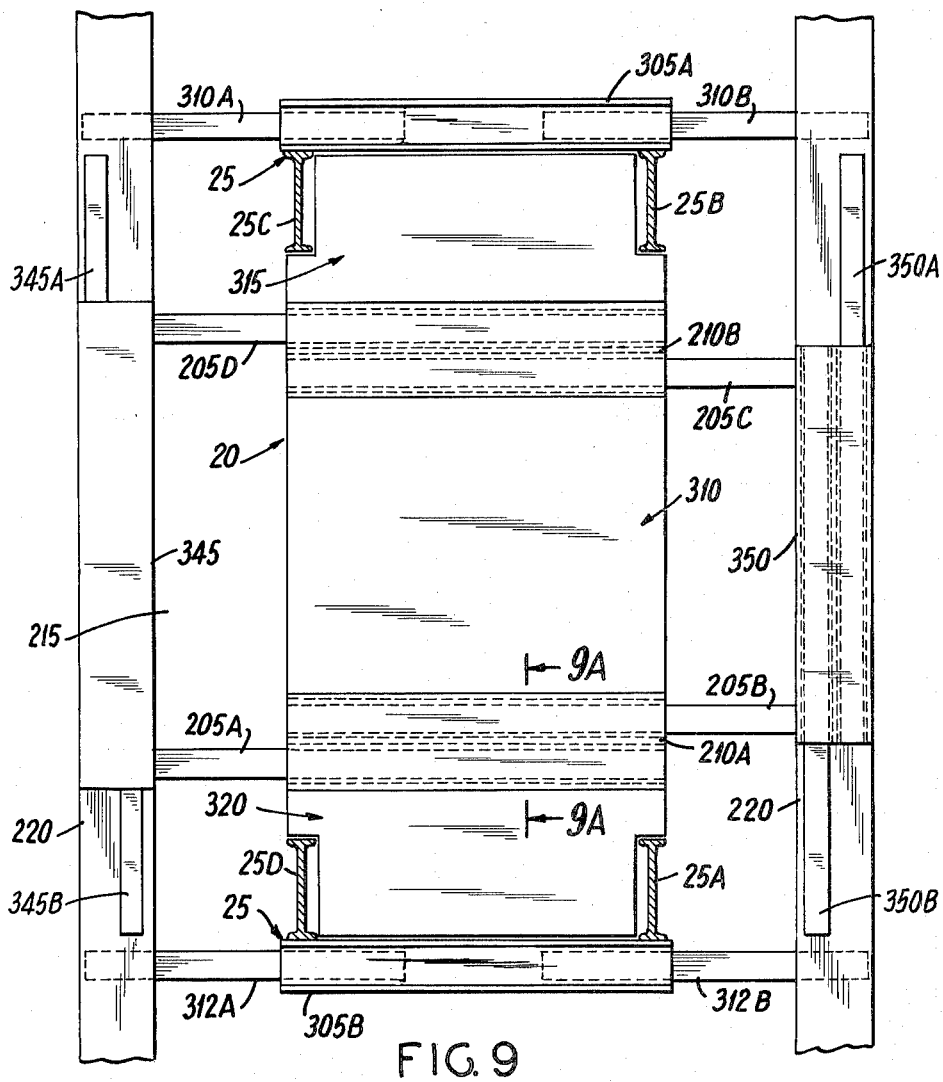
Figure 9A:
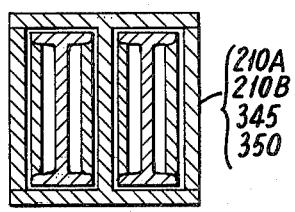
Figure 10B:
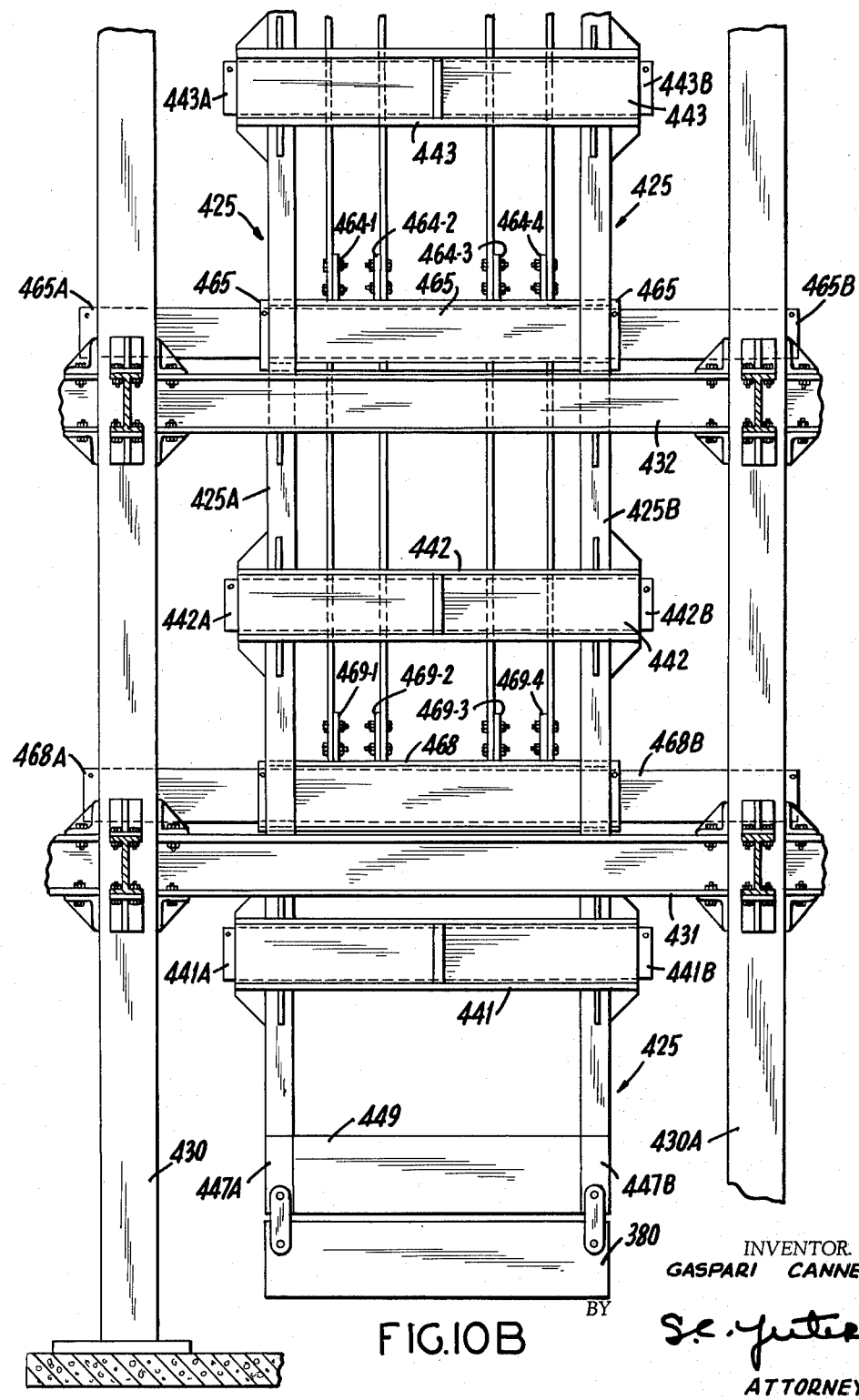
Figure 14:
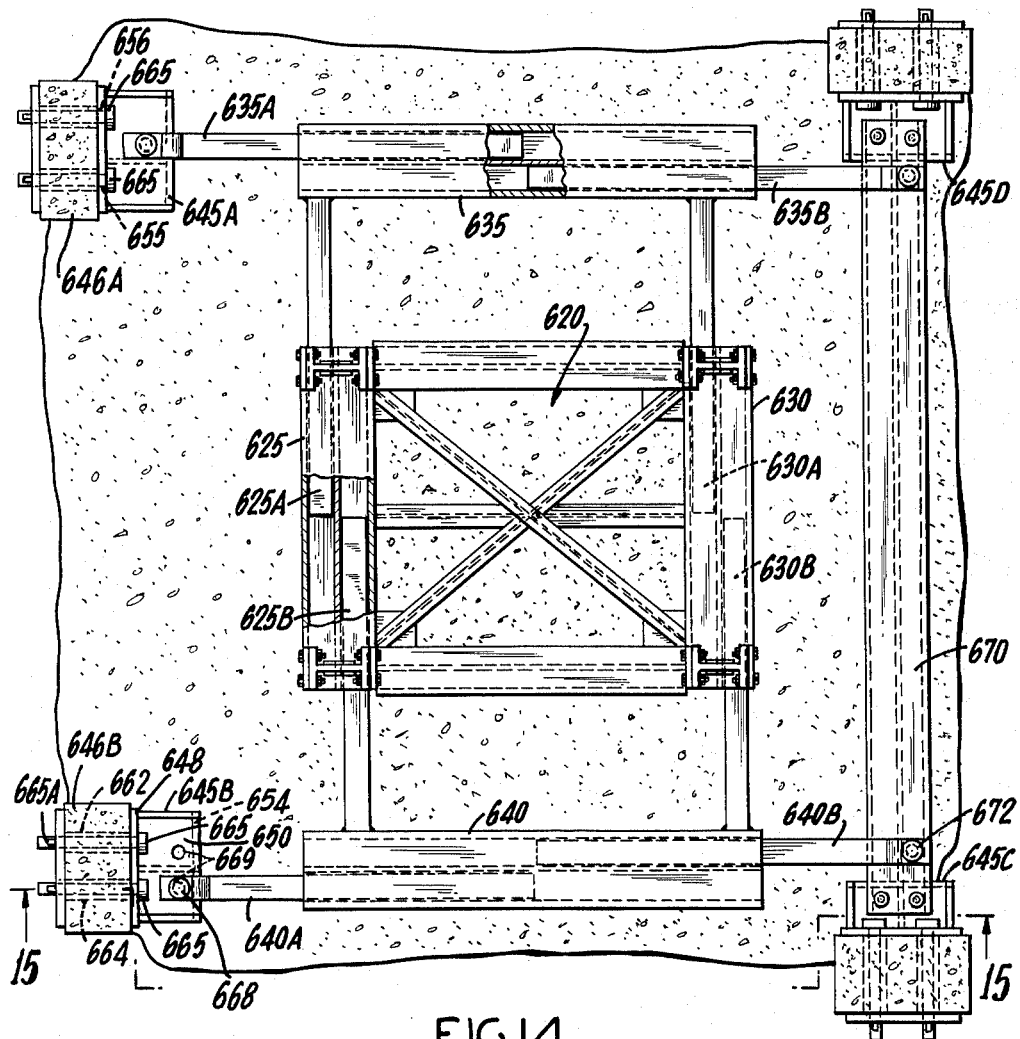
Figure 15:
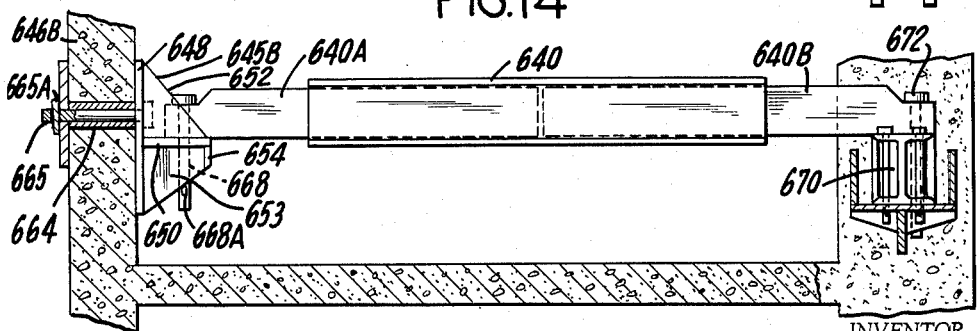

FIGURE 5 is a plan view of the crane platform, showing the power transmission unit and the cable drums driven thereby to collect or to play out cable, and showing various sheave pulleys for guiding the cable onto and off the drums, and showing further the manner in which the two end portions of the platform extend into open window spaces between corner columns of the associated cage, so the guide sheaves and the pulleys adjacent the four corners of the platform can co-operate with similar guide and block sheave pulleys at corresponding locations on the top cross beams of the cage connecting the upper ends of the cage side columns, as may be better seen in FIGURES 6 and 7;

FIGURE 6 is a schematic vertical end elevational view taken along lines 6—6 in FIGURE 5, and shows the cage and the platform with their respective power and guide sheave pulleys to supplement the view in FIG- URE 7 which shows the arrangement of the pulleys for the cables;

FIGURE 7 is a vertical view partially in elevation and partially in section, to show the driving shaft and the driving gears from the power supply to the cable drum shafts, and also to show the location and disposition of the outrigger beams and housing conduits on the crane platform;

FIGURE 8 is a vertical sectional front view, taken longitudinally along lines 8—8 through the arrangement shown in FIGURE 5, to show the cable drums, the idler guide sheave pulleys adjacent the drums, and the arrangements of the power sheaves on the platform and also on the upper and the lower cross pieces between the cage columns;

FIGURE 9 is a schematic plan view of the cage and of the platform, showing how the cantilever outrigger beams from the cage, and those from the platform, may be extended to rest on the beams and girders of the building frame structure, and how the outrigger beams are supported within their own respective conduit housings in their respective retracted positions;

FIGURE 9A is a sectional view taken along lines 9A—9A of FIGURE 9;

FIGURE 10 includes FIGURES 10A and 10B to constitute one figure on two separate sheets, showing the manner in which the crane is supported by its platform which is shown in form and disposition to receive structural support from three sets of supports on vertical columns at three different floor levels of the building structural framework;

FIGURE 11 is a schematic plan view showing the cage resting on the crane platform base structure;

FIGURE 12 is a partial elevational side view of the structure of FIGURE 11;

FIGURE 13 is a schematic force diagram relating the boom and the lift cables at a low position of the boom;

FIGURE 14 is a schematic plan view of an outrigger structure and shows various arrangements for supporting the outrigger beams on the vertical columns, including brackets on the columns and a jumping beam between two columns;

FIGURE 15 is an end view, partially in elevation and partially in section, of an outrigger structure of FIGURE 14; and FIGURE 16 is a side view, partially in elevation and partially in section, of a multi-story cage-and-crane assembly shown in position in a concrete building structure being erected.

Figure 1:
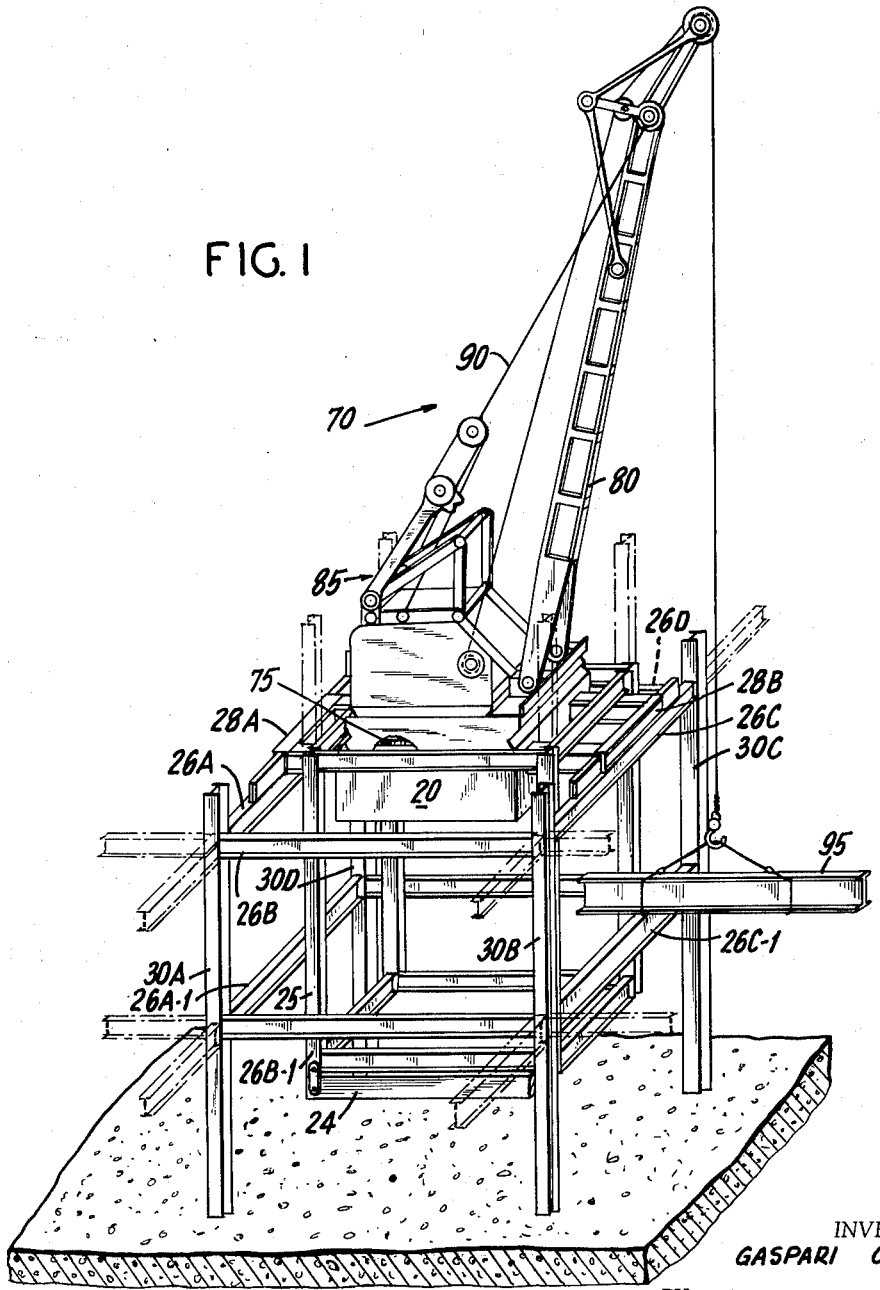
FIGURE 1 is a schematic perspective view showing an elevator crane and cage, in accordance with the present invention, supported at one level of a building structural framework with the framework serving as a support for the crane structure.

An important field of use for the invention, and the manner in which the invention may be utilized, will be readily appreciated upon reference to FIGURE 1. As shown in FIGURE 1, an elevator crane embodying the present invention, and the manner in which it may be utilized, are illustrated in connection with a structural framework of what will be a tall building.

A feature of the invention is that it utilizes the strength of a fabricated building framework as it is being progressively erected. The elevator crane operates to raise itself from one floor level to the next as the fabrication of the framework proceeds. Whether the framework is entirely of metal consisting of steel columns, girders and beams, or whether it is of reinforced concrete is immaterial, except that of course where concrete is employed, sufficient time must be permitted for the concrete to set and harden before the reinforced concrete is subjected to the load of the crane. In the case of concrete, the columns are used instead of the beams for the desired support.

As shown in FIGURE 1, primary elements of a steel building structure are indicated, and to explain the present invention, reference will be made primarily to four vertical steel columns 30A, 30B, 30C and 30D as connected by steel cross beams or girders 26A, 26B and 26C, and a beam 26D not seen. In any such building that is being erected, the framework will be such as to have one or more continuous air shafts, to accommodate elevators, for example, or to outline the spaces of superposed cubicles that will constitute rooms in the finished building. Any such vertical air shaft may be utilized as the vertical path for the elevator crane disclosed herein.

FIGURE 1 shows schematically a generalized arrangement defining such an air shaft within which the crane may be disposed for its intended operation. As there shown, a cage 25 with counter-weight 24 is provided with appropriate dimensions to permit easy clearance of the cage in its upward and downward movement within the air shaft defined by the cross girders 26A, 26B and 26C. Within the cage 25 is disposed a platform 20 for the crane corresponding substantially to the platform 20 shown in the cage 25 of FIGURE 4. For simplicity, the cable connections between the platform and the cage are not shown in this FIGURE 1. The platform 20 is shown, however, as being supported on the two side beams or girders 26A and 26C by two cantilever outriggers 28A and 28B, shown extending outward to the left and to the right fo the platform 20 and resting on the side beams 26A and 26C. The platform 20 comprises a relatively heavy and rigid box structure which serves both to contain transmission gearing and to support a rotating table 75 for the crane 70. In order to be able to operate the crane in a full circle in azimuth, the rotatable table 75 is provided upon which a crane boom 80 is pivoted at its bottom end, and other components that are to co-operate with the boom are mounted on said table 75 to rotate with the boom as it is swung around on and by the table 75.

The rotating table 75 also serves to support a gantry assembly 85, which will be described in more detail below, and a top and lift or hoist cable assemly 90 which also will be described below.

At this time in connection with FIGURE 1 it is desired to direct attention to the fact that the outrigger structures 28A and 28B, which support the platform 20, and the crane assembly including the boom 80 and a load 95, shown as a beam, are all ultimately supported by the structural framework of the building, including the columns 30A, 30B, 30C and 30D, and the connected girders 26A, 26B and 26C. The cage 25 and the counterweight serve together as a total counterweight to anchor the platform and the crane.

As will be shown in subsequent figures, the cage 25 is also provided with outrigger cantilever beams which may be positioned to rest on top of suitable supports, which for the present may be the pair of opposite parallel girders.

Figure 2:
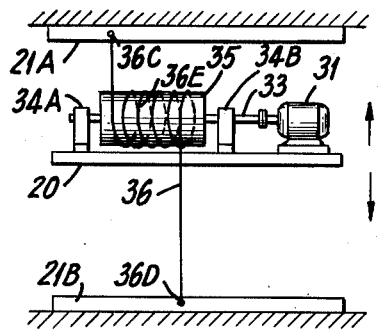
FIGURE 2 is a schematic diagram of an arrangement whereby a floating platform may be moved between two levels by a winch and cable on the platform.
Figure 3:
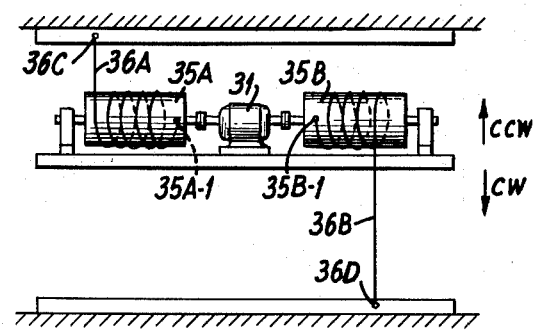
FIGURE 3 is a schematic view of an arrangement similar to FIGURE 2 in which the cable has been divided into two parts and each part of the cable provided with its own drum.
Figure 4:
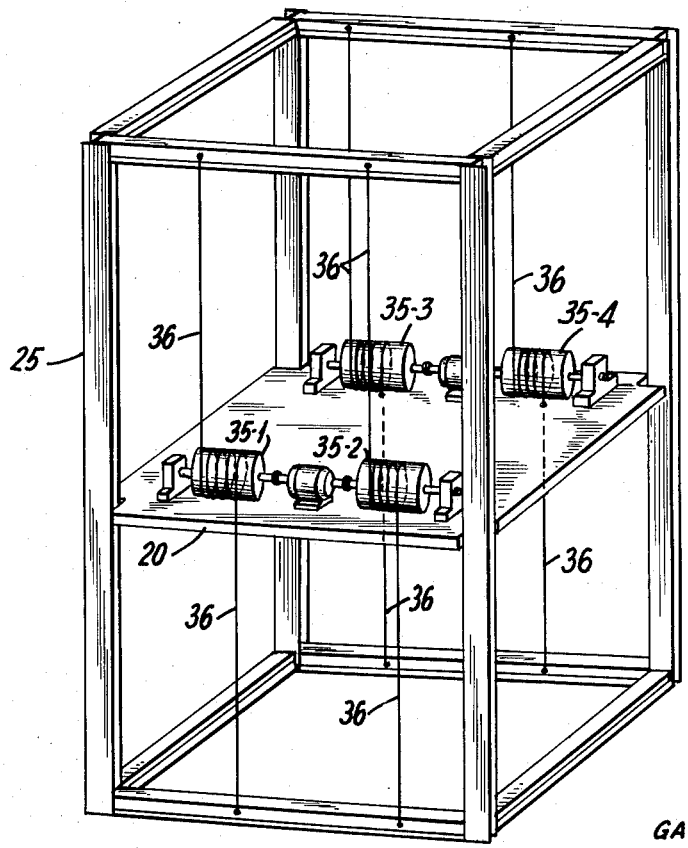
FIGURE 4 is a schematic view of a stationary frame or cage structure and a platform movable within the frame or cage by apparatus such as shown in FIGURE 3.

The manner in which the cage 25 and the platform 20 are functionally related, and the principle of operation that controls their relative motion and positioning, are shown in FIGURES 2, 3 and 4.

As shown in FIGURE 2, a platform 20, which is subsequently to serve as a platform for power transmission equipment and a crane, is to be controlled to be movable between two levels indicated by structural members 21A and 21B that are indicated to be in fixed position by the cross-hatching associated with each of the two structural members 21A and 21B.

Power to move the platform 20 is derived from a suitable motive device, such as a motor or engine 31, operating through suitable gearing to rotate a cable drum 35 through a suitable shaft 33.

The shaft 33 for the drum 35 is shown schematically supported between two bearings 34A and 34B that are rigidly secured to the platform 20. A cable 36 is anchored at one end 36C to the fixed member 21A and the other end 36D of the cable is anchored to the fixed structural member 21B. The intermediate portion 36E of the cable is looped around the drum 35 which will be driven by the motive device 31 to serve as a winch to coil in the cable from one end and to release or pay out cable at the other end.

As may be seen from FIGURE 2, when the motive device 31 turns clockwise, as viewed from the right hand end, the drum 35 will release cable towards the upper end and will tend to pull in cable from the lower end. Consequently, the platform 20 will move downward when drum 35 turns clockwise. When the motive device 31 turns counterclockwise, the drum 35 will wind in cable from the top end of the cable and will therefore raise the platform 20 towards the upper stationary supporting structural member 21A.

Thus, by means of the principle indicated in FIGURE 2, the platform 20 may be moved in one direction or the other, relative to the two stationary structural members 21A and 21B.

The drum 35 shown in FIGURE 2 may be modified to embody two separate drum sections 35A and 35B as in FIGURE 3. With this arrangement the cable 36 is also divided into two separate cables 36A and 36B. The outer ends of the two cables are anchored at the points 36C and 36D, as shown, and the inner ends of the cables are suitably anchored on the respective drum sections 35A and 35B by any suitable means, here indicated merely schematically as the points 35A-1 and 35B-1. Since the platform 20, shown schematically in FIGURES 2 and 3, must carry a very heavy weight for the purpose of the present invention, the platform is further modified in connection with the cable-moving apparatus, in the manner illustrated schematically in FIGURE 4, to hold the platform horizontal at all times.

As shown schematically in FIGURE 4, the platform 20 is provided with suitable apparatus for selectively raising or lowering the platform 20 within a structure schematically indicated and shown as the cage 25. A cable arrangement similar to that shown in FIGURE 2 is disposed adjacent each of the four corners of the platform 20 with a common drive for each side. The outer cable ends of each cable arrangement are anchored adjacent the top and the bottom related corners of the cage 25. Thus, four cable drums 35-1, 35-2, 35-3 and 35-4 are here provided.

In the arrangement shown in FIGURE 4, it is presumed, for this explanation, that the cage 25 is resting on its bottom as a stationary structure, and that the platform 20 is then adjustably movable vertically upward or downward, as an operator may select, by controlling the direction of rotation of the cable drums through the associated transmission gears and clutch mechanism.

Since the movement of the platform 20 is relative to the cage 25, it is obvious that the cage may be controlled similarly to be considered movable with respect to the platform, if the platform is suitably supported and anchored. Consequently, if suitable arrangements are made to anchor the platform 20, to hold it as a stationary structure, the operation of the cable drums may be utilized to correspondingly raise or lower the cage 25, according to the respective directions of rotation of the cable drums 35-1 to 35-4, inclusive.

This feature of controlling the relative movement between the platform 20 and the cage 25, by suitably anchoring one or the other, depending on which of the two is to be made movable, is an important feature of the present invention. Movement of either the platform or the cage may be desired at one time or another independently of the other, or to permit successive alternate movements to raise or to lower the platform 20 and the crane 70 relative to a building structure.

For proper operation of the platform 20 and its supported crane, the platform should be held in horizontal position during its upward and downward movements. That condition is assured by the use of one set of cables for each corner of the platform 20, with synchronous control of the cables. The drums and related equipment for controlling the winding and unwinding of the cables are shown in more detail in the plan view in FIGURE 5 and the vertical schematic view of FIGURE 6.

As shown in FIGURE 5, four drums 35-1, 35-2, 35-3 and 35-4 are provided, which are functionally equivalent to the correspondingly numbered drums in FIGURE 4. The drums are arranged to be driven from a central power plant 31, which need not be shown in detail, but which includes suitable transmission gears to drive two output shafts 31A and 31B.

Power from the first power shaft 31A is delivered to the drum 35-4 through an idler gear 37-1 and a drive gear 38A suitably keyed or pinned to the drive shaft 40 for supporting and driving the drum 35-4.

Power from the first power shaft 31A is delivered to the other drum 35-1 through two idler gears 37-2 and 37-3 and a drive gear 38B suitably secured to the drive shaft for the drum 35-1.

The meshing arrangement of these various drive gears and idler gears in FIGURE 5 will be more readily appreciated upon reference to FIGURE 7.

The second power shaft 31B similarly supplies driving energy to the other two drums 35-2 and 35-3, through similar gear trains. Thus, drive gear 31B-1 drives idler 27-1a and a drive gear 38A-1 that is keyed or otherwise connected to the drive shaft for the drum 35-3. At the same time, the power shaft 31B supplies power to the other drum 35-2 through drive gear 31B-1, idler 37-2a and idler 37-3a and drive gear 38B-1 that is keyed or otherwise pinned to the drive shaft that supports the drum 35-2.

The drive shafts for the four drums 35-1, 35-2, 35-3 and 35-4 are all supported for individual rotation between bearings mounted on inner bearing plates 42 and 42A and outer bearing plates 44 and 44A.

The bearing plates 42 and 44 on one side of the platform and the bearing plates 42A and 44A on the other side of the platform serve to provide longitudinal side members to constitute part of the rigid box structure for the platform 20 that serves to support the crane and all of the power transmission apparatus.

Bearings 46 and 46A provide bearing supports for the inner ends of the drive shafts for the set of drums 35-3 and 35-4 and the set of drums 35-1 and 35-2.

As explained in connection with FIGURES 3 and 4, the drums collect and accumulate the cable at one end while playing out cable at the other end of each drum. In such manner, the relative location of the platform and of the cage is easily controlled, to raise the platform when the cage is anchored and held stationary, or to raise the cage when the platform is anchored and held stationary. Similarly, the platform or the cage may be respectively lowered.

Various pulleys or power sheaves and equalizing sheaves are indicated in FIGURE 5 for controlling the cable movement onto and from the drums. Reference should be made also to FIGURES 6, 7 and 8 which show vertical sectional views, to envisage the details of the cable arrangements more clearly.

As shown in FIGURE 5, a separate drum section is provided for each corner. The drum-supporting platform 20 is shown as an assembly vertically movable within the supporting cage 25. Only the vertical corner columns of the cage are shown, as I-beams 25A, 25B, 25C and 25D, adjacent the corners of the platform 20. The two side-end regions of the platform 20 are disposed in vertical alignment with similar end regions of the cage 25, as is more apparent in FIGURE 7 and 8. Those respective end regions accommodate the pulley blocks for the cables.

A transverse shaft 101 (FIG. 6) is supported adjacent one upper end of the cage 25 and supports a set of pulleys adjacent each of the two opposite corners to control the cable for each corner. The shaft 101 is shown supported between suitable bearings 101A, 101B and 101C to permit the shaft 101 to have free rotation.

A similar transverse shaft 102 is supported adjacent the lower end of the cage. Similar bearings 102A, 102B and 102C are provided for that shaft 102 to permit it to have free rotation.

Three power sheaves 110–4, 111–3 and 112–4, related to drum 35–4, are rotated supported on the shaft 101. A guide pulley 113 is also supported on the upper shaft 101. Similar power sheaves and a guide pulley are supported on lower shaft 102.

The platform 20 is shown in FIGURES 6, 7 and 8 to have an upper and a lower level, with the cable drums and sheaves located as shown.

On the upper level of the platform 20, (FIG. 6) a shaft 121 is supported in structural bearings 121A, 121B and 121C. Two power sheaves 124–4 and 126–4, also related to drum 35–4, are rotatably supported near one outer end of the shaft 121 in locations to permit co-operation with the related top power sheaves 111–4 and 112–4 supported at the upper level of the cage 25.

Limiting stop brackets 128 and 130 are shown pinned to the upper shaft 101 on the cage, in order to limit endwise movement of the three power sheaves 110–4, 111–4, and 112–4. A similar limit bracket 132 is pinned to the shaft 121 on the upper part of the platform 20, to similarly limit endwise movement of the power sheaves 124 and 126 on their supporting shaft 121.

An equalizing sheave 135–4 is shown supported on the upper level of the platform 20, and a similar equalizing sheave 135–4L on the lower level.

The cable disposition and arrangement may now be followed.

As shown in FIGURE 6, an adjustable turn buckle 140 is anchored at one end to a stationary pin or bar 142 in the top frame structure of the cage 25. The other end of the turn buckle 140 is provided with an eye 140A to which one end of the cable 136 is tied.

The progress of the cable 136 may then be followed from the turn buckle eye 140A down past the guide pulley 113 onto the sheave 126–4 on platform 20, then back up to the sheave 112 on the cage shaft 101, thence back down and around the sheave 124 on the platform 20 and back up to the sheave 111 on the cage shaft 101, thence back down and around the equalizing sheave 135–4 on the platform 20, thence back up and around the sheave 110 on the cage shaft 101, thence down to and around a slidable guide sheave 145 (FIGURE 8) and then onto the related drum 35–1 not visible in this figure, but visible in the plan view of FIGURE 5 and in the vertical section of FIGURE 8.

From FIGURES 5, 6, 7 and 8 it is clear that the power sheaves 111 and 112, and 124 and 126, are arranged to serve as pulley blocks between the platform 20 and the cage 25.

To further identify the respective pulley blocks, they are also post-numbered with a numeral identifying the related drum, as 1 to 4 of the series 35–1 to 35–4, for example, pulley 110–1.

From FIGURES 5 and 8 it is clear that as the front portions of the two front drums 35–1 and 35–4 reel in and accumulate cable from the two front upper cables 136–1 and 136–4, in the directions of the top arrows 136–1UP and 136–4UP, the rear portions 35–1A and 35–4A of those same two front drums 35–1 and 35–4 release correspondingly equal amounts of the two front lower cables 136–1A and 136–4A to the lower set of pulley blocks from accumulated cable on said rear portions 35–1A and 35–4A of those two front drums 35–1 and 35–4, as indicated by the bottom arrows 136–1A–UP and 136–4A–UP.

The two rear drums 35–2 and 35–3 operate similarly, and synchronously, with the front drums 35–1 and 35–4, to establish balanced and uniform forces on the platform corners to hold the platform horizontal, and to prevent tipping during such lifting movement to raise the platform.

Conversely, when the platform 20 is to be lowered, the front portion of the front right-hand drum 35–1 plays out and releases cable 136–1 to the associated front upper set of pulley blocks, represented by cage pulleys 110–1, 111–1 and 112–1, and by the platform set of pulleys 124–1 and 126–1 on the right-hand side (FIGURE 8), and the left-hand front drum 35–4 releases cable 136–4 to the front upper set of pulley blocks on the left-hand side, represented by the set of cage pulleys 110–4, 111–4 and 112–4, and by the set of platform pulleys 124–4 and 126–4. The released cable 136–1 and 136–4 is in the direction indicated by arrows 136–1DOWN and 136–4DOWN.

It should be noted that the section of cable 136–S–1 and the section 136–S–2 are not actually loose in the manner shown, but actually are anchored at their respective ends to the related drum, in the manner indicated in FIGURE 3.

While those front portions of the drums 35–1 and 35–4 are releasing cable to said front upper sets of pulley blocks, the rear portion of the drum 35–1A is reeling in cable from the related front lower right-hand sets of pulley blocks (FIGURE 8), represented by the set of cage pulleys 110–1L, 111–1L and 112–1L on the right-hand side, and by the set of platform pulleys 124–1L and 126–1L. Similarly, the rear drum portion 35–4A is reeling in cable from the front lower left-hand sets of pulley blocks (FIGURE 8), represented by the set of cage pulleys 110–4L, 111–4L and 112–4L, and represented by the set of platform pulleys 124–4L and 126–4L.

Here, again, it should be noted that the ends of the cable sections 136–S–1L and 136–S–4L are not loose, but are anchored to the related drum. In each case, sufficient cable is available on the drum and between the two related sets of pulleys to enable the movable platform to travel through a predetermined vertical path up or down.

By thus operating the cable arrangements above and below the platform, as shown in FIGURES 6 and 8, simultaneously, the operation and movement of the platform 20 can be positively controlled and stabilized, so that gradual and incremental movement of the platform 20 can be established and controlled.

Since a similar cable arrangement and block and tackle control for the cable is provided at each top and bottom set of the four corners of the cage and the corresponding four corners of the platform, complete control is established to achieve desired relative movement between the cage and the platform.

Thus, as originally indicated, and as will be described below, the cage may be suitably anchored in order that the cables on the drums on the platform 20 may be utilized to raise the platform 20 to a higher level within the cage.

Similarly, when the platform 20 is anchored on the appropriate parts of the building structure, the cable assemblies may be employed to raise the bottom level of the cage to a higher elevation at which the cage can then be appropriately supported on the building structure at a desired level. Then the platform 20 may again be adjustably positioned to any level desired within the limits permitted by the dimensions of the cage.

FIGURES 5 to 8 show the relative disposition of the platform 20 within the cage 25 and the arrangement and location of several sets of power sheaves of the pulley blocks, with the drum structures arranged to wind in and accumulate one of the cables while releasing and unwinding a corresponding length of the other cable. Since the several drums are driven from a single power source through similar transmissions, the established angular movement in all the drums will be the same and the resulting linear effect on the related cables will be equal. Thus the movement of the platform is equalized at all four corners, thereby assuring that the platform will always be in horizontal position as it is moved from one position to another.

Upon reference to FIGURES 5, 6 and 8, it will be seen that when drive shaft 40 for drum 35–4 rotates clockwise, the front part of drum 35–4 unwinds and releases cable to supply cable 136–4 under guide pulley 146–4 to upper cage pulley 110–4. At the same time, rear part 35–4A of the drum pulls in and accumulates cable 136–4A, over guide pulley 146–4A, from lower cage pulley 110–4L.

In similar manner, each of the other drums 35–1, 35–2 and 35–3 controls the cables to the associated sheaves and pulleys.

It is important to note here that the guide pulleys 146–1 and 146–1A associated with drum 35–1 and the pulleys 146–4 and 146–4A associated with drum 35–4 are shown vertically spaced to clarify the location of the cables moving over them. Actually, those guide pulleys may be mounted on the same shaft 103, as shown in FIGURE 5, and indicated by the same numeral in FIGURE 8. This shaft 103 serves also to support the correspondin guide pulleys related to the drum 35–3. A similar shaft 103A on the other side of the platform supports similar guide pulleys for the two drums 35–1 and 35–2, one set of pulleys 146–1 and 146–1A being shown in FIGURE 8.

All of those guide pulleys 146–1 and 146–1A to 146–4 and 146–4A are supported on the shafts 103 and 103A for both rotating and sliding movement.

In FIGURE 8, the upper ends of the upper cables 136–1 and 136–4 and the bottom ends of cables 136–1A and 136–4A are anchored in the manner illustrated in more detail in FIGURE 6. In FIGURE 6, the top and the bottom pulley and cable arrangements are shown for only one corner of the platform and the related drum 35–4. Each of the other three corners of the platform is provided with similar pulley and cable arrangements for the corresponding drums 35–1, 35–2 and 35–3.

The equalizing sheaves 135–1 to 135–4 are shown in FIGURE 5, and 135–3 and 135–3L and 135–4 and 135–4L are shown in FIGURE 6. As shown in FIGURE 6, at the upper right-hand corner, and in FIGURE 8 at the upper left-hand side, the downward bight of cable 145–4 to be accumulated on the associated drum 35–4 is guided by a guide pulley 146–4, also shown in FIGURE 5, onto the drum 35–4.

Thus the platform 20 may be elevated by the four sets of upper cables between the four corners of the cage and four corners of the platform, and the platform is further stabilized by the joint operation of the lower cables at the four corners.

As previously stated, either the cage or the platform may be appropriately supported and anchored on the building framework while the other member may be freely moved upward or downward relative to the anchored member.

Upon referring to FIGURE 7 again, it will be observed that the platform structure embodies an upper turntable 200, to support the crane, and a box enclosure 202 for the power plant and transmission already referred to in connection with the several drive gears shown in FIGURE 7.

The platform structure is shown as fitting within the cage for free relative vertical movement, but without too much space between the platform structure and the cage structure.

At this time, reference may now be made in FIGURE 7 to the outrigger beams 205A, 205B, 205C and 205D of the platform 20. These outrigger beams are shown disposed in compartments within their supporting housing structures 210A and 210B which are rigid structures constituting part of the entire platform structure for the crane. The manner in which these outrigger beams are utilized is shown in FIGURES 9 and 10.

FIGURE 9 shows a schematic plan view that illustrates the disposition of the cage 25 and the crane platform 20 within a bay or space 215 within the framework 220 of a building, preferably an elevator shaft, and shows particularly the manner in which the outrigger cantilever beams from the cage 25 and those from the platform 20 may be extended outward to rest on the structural steel framework of the building in order to support either the cage or the platform, depending upon which is to be supported on the framework for the time being.

The cage is shown comprising the four vertical columns 25A to 25D at the corners. Two end cross-structures 305A and 305B, one at each end of the cage, serve as end-wall structures to join the two sets of cage columns at the end corners, and they also serve as housings or casings to accommodate outrigger beams 310A and 310B at one end of the cage structure, and outrigger beams 312A and 312B at the other end of the cage structure.

The cage outrigger beams 310A and 310B are each of a length corresponding substantially to the width of the cage structure. A separate compartment is available for each of the outrigger beams 310A and 310B, and similarly for the outrigger beams 312A and 312B. Those beam compartments at each end of the cage are at superposed levels, to permit such full length compartments to be available for each of the outrigger beams.

The platform 20, for supporting the crane and the power supply and transmission gearing, as previously shown in FIGURE 7, may now be better seen in its dimensional and functional relationship to the cage as shown in this FIGURE 9.

The platform 20 generally comprises the mid-structure 310 and two end frame structure sections 315 and 320. The mid-structure 310 includes the structure that supports the power plant unit and the transmission gearing to the drums, as well as the turntable 200 for the crane, shown in FIGURE 7, and the transmission equipment for rotating the crane turntable 200. The one end frame structure section 315 of the platform 20 includes the structural support or framework 325 (FIGURE 7) to support the shaft 121 for the upper set of cable sheaves represented generally by the numerals 124–3 and 124–4 and 126–3 and 126–4 related to the respective drums 35–3 and 35–4. The framework 325 (FIGURE 7) also supports the lower shaft 122 to accommodate the lower set of power cable sheaves (FIGURES 5 and 6) represented generally by the numerals 124–3A and 124–4A and 126–3A and 126–4A related to the respective drums 35–3 and 35–4.

Referring again to FIGURE 9, the other end section 320 of the platform 20 includes the frame structure 325A, better shown in FIGURE 7, which supports the two shafts 121–1 and 122–1, similar to 121 and 122, for rotatably supporting the power sheaves associated with the other two related drums 35–1 and 35–2.

The platform outrigger cantilever beams, first referred to and illustrated in FIGURE 7, and identified by the series of numerals 205A to 205D, are now better seen in their functional disposition in FIGURE 9.

The two platform outrigger beams 205A and 205D (FIGURE 9) constitute one joint pair or set, which are joined near their outer ends by a connecting beam housing 345. In similar manner, the outer ends of the two cantilever beams 205B and 205C are joined by a beam housing 350.

FIGURE 9A shows a sectional view of the housings 210A, 210B, 345 and 350, each for accommodating two outrigger beams.

The two connecting outrigger beam housings 345 and 350 serve two functions: first, they operate the two related outrigger beams in unison, and second, those related outrigger beam housings 345 and 350 each support two other beams 345A and 345B, and 350A and 350B, which may be used for support on auxiliary "jump" beams which provide temporary support between available structural members in regions where the building structure does not itself provide an element directly available for support.

With the outrigger beams located in the relative positions shown in FIGURE 9, it will be apparent that there is no interference between the outrigger beams from the cage and those from the platform. Of course, only one set will normally be used at one time. Thus, either set of beams may be extended, as may be necessary or desired, to enable either set of beams to provide the support for the cage or for the platform. Moreover, either can be moved while the other is in stationary support.

At this point it is desired again to direct attention to the relatively close fit between the platform structure and the cage. The corner columns of the cage 25 are held together by the outrigger housings 305A and 305B at the outer surfaces of the columns of cage 25, (FIGURE 9). The tops and bottoms of the columns of cage 25 are connected longitudinally by the top and bottom box sections 360 and 365, better seen in FIGURE 7. The tops and bottoms of the columns 25, of FIGURE 9, in addition to being held together by the outrigger beam housings 305A and 305B, are also held together at the tops and bottoms by the box structures 370A and 370B at the tops, in FIGURE 7, and by similar box structures 375A and 375B at the bottoms of the columns of cage 25.

The advantage that is derived from this feature of relatively close fit between the platform 20 and the cage 25, in the manner illustrated in FIGURE 9 for example, is that any tilting of the platform is substantially limited. Any small angular tilt of the platform is sufficient to establish engagement between the platform structure and the cage structure, whereupon the reaction pressure of the cage prevents further tilting of the platform 20. The reaction pressure of the cage is derived from the reaction supporting pressures on the outer ends of the cantilever outrigger beams where those cantilever outrigger beams rest upon the building framework for support, and from the weight of the cage together with the counterweight 380 at the bottom of the cage, as in FIGURES 1 and 10B. Moreover, the the depth of the cage structure, over a distance of several floors, provides a long moment arm for various balancing forces including the weight of the counterweight.

A feature of the supporting arrangement that is illustrated in FIGURE 9, is that in parallel alignment with the gravity axis, the weight to be supported is distributed relatively equally between the several points of support where the outer ends of the beams rest on the girders of the building structure. Any tilting action of the platform and its supported crane increases somewhat the pressure against the cage structure, but because of the extended length and moment arm of the cantilever supporting beam for the outrigger support, the reaction pressure on the girder is correspondingly reduced.

As will be shown further, the weight of the cage plus the counterweight provide substantial anchorage for the platform. Moreover, the relative movement permissible between cage and platform, and their separately operative cantilevers, permits the platform cantilevers to be supported on top surfaces of girders, while the cantilever beams of the cage may be pressed upward against the under surfaces of girders to lock the platform and the cage to the building structure.

The construction of the cage as thus outlined, is generally indicated in the showing in FIGURE 1, in which the height of the cage is indicated to be somewhat more than the space between two adjacent floor levels. The outriggers for the cage are not shown in FIGURE 1. However, since the cage outriggers are supported on the outer contours of the cage and would not interfere in any way with movement of the platform within the cage, it can be seen that the cage could be provided with at least several additional sets of outrigger beams that would permit the cage to be supported on the girders at two or more floor levels instead of on just one. Also, the cage can be moved freely to place cantilever beams under and braced upward against selected girders.

Similarly, if the platform structure were extended downward for a distance exceeding the distance between floor levels, it is clear that an additional set of outrigger cantilever beams could be supported on the downwardly extending structure of the platform, so that the beams extended at a lower level could also be employed to provide some additional support for the platform.

By thus providing cantilever beams for use at different spaced floor levels on the cage, and also on the platform, the total weight of the platform and the crane is distributed over a larger number of supporting beams and girders, thereby assuring that the stresses set up in the supporting structure will not exceed a maximum operating limit that might be well below the ultimate limit of strength of the supporting girders.

In FIGURE 10, shown on two of the accompanying sheets as FIGURE 10A and FIGURE 10B, such a multi-story cage and crane platform support structure is shown.

In the elevational view in FIGURE 10, two structural steel columns 430 and 430A are shown, which generally may be considered to be similar to columns 30 and 30A of FIGURE 1. Three floor levels are shown in FIGURE 10, the first two floors on sheet FIG. 10B and the third floor on sheet FIG. 10A, to illustrate the disposition of a cage with several sets of outrigger beams to establish a supporting arrangement on several floors, here shown for example as three floors. Three structural cross beams 431, 432 and 433 are shown appropriately secured to the two columns 430 and 430A.

A three-floor-level cage 425 is shown with a crane platform 420 at the top of the cage shown with a crane 470 having its boom 480 supported in vertical position.

Additional structural columns, similar to 430 and 430A, are disposed in spaced relation behind the two columns 430 and 430A that are shown in FIGURE 10. Structural connecting beams extend backward to connect the two vertical columns that are shown with those that are disposed in spaced relation behind the front columns 430 and 430A. The backwardly extending connecting cross beams will be at the same level as the floor beams 431, 432 and 433 of that part of the structural framework that is already completed.

The cage 425 is shown with two front vertical corner columns 425A and 425B, which are rigidly connected by three housings 441, 442 and 443, that serve, in turn, to support the associated cantilever outrigger beams 441A and 441B, 442A and 442B, and 443A and 443B. The corresponding back vertical columns of the cage are rigidly connected by three similar housings (not shown) for accommodating similar associated outrigger beams also not shown. A similar group of outrigger housings for the cage structure are mounted on the opposite or far side of the cage as shown in FIGURE 10 and serve to hold the rear cage columns rigidly connected together.

The front and rear columns of the cage are joined by two horizontal top plates or beams 445A and 445B, and the bottom ends of the corner columns of the cage are joined and rigidly connected by two bottom horizontal beams 447A and 447B, extending backward as viewed in FIGURE 10B. Additional transverse plate or beam structure is connected to the top ends of the back columns of the cage shown by the back cross beam 448. The bottom ends of the back or rear columns of the cage are connected by a similar transverse beam 449.

The crane 470 is shown mounted and supported on a rotatable table 450 which is arranged to be rotated through suitable gearing, not shown, driven from the power equipment and transmission gearing supported in the structure of the crane platform 420.

The platform 420, that supports the crane 470, is provided with a structure that may be fabricated in place to permit the crane to be elevated floor by floor, within the cage, by means of the cable lifting assemblies shown and described in the previous figures.

In the construction shown in FIGURE 10A, the crane platform 420 embodies a housing 460 that accommodates two platform or crane outrigger beams 460A and 460B. That housing 460 is also provided with suitable bottom brackets 461-1, 461-2, 461-3 and 461-4, to receive connections to corresponding bracing strut beams or plates 462-1, 462-2, 462-3 and 462-4. Those bracing strut beams in the 462 series extend downward and are arranged to be connected to a corresponding set of brackets 464-1 to 464-4 that are rigidly connected to a crane outrigger housing 465 that accommodates two retractible and extensible cantilever outrigger beams 465A and 465B.

The vertical strut beams 462-1 to 462-4 for the crane platform extend downward to a third crane outrigger housing 468 which is rigidly connected to those bracing beams through similar brackets 469-1 to 469-4 inclusive. The housing 468 accommodates two cantilever beams 468A and 468B which may be retracted into the housing 468 or extended outward to provide support on the cross beams or columns.

When the framework to be erected for the building is made of structural steel, the cross beams in themselves have sufficient strength to support the platform for the crane, with the crane and its connected load, particularly when the weight of the platform and its crane and load are distributed on a pair of beams on one floor, or on two or three pairs of beams on a corresponding number of floors.

However, when the framework of the building that is to be erected is of reinforced concrete, the cross beams in themselves do not provide sufficient strength to support the load of the crane platform and the crane, since the beams would be placed in tension beyond the limits of their ultimate strength. Therefore, in the case of a concrete structure, the support for the crane and its supporting platform is derived from the vertical columns of the concrete structure, which can withstand much greater forces since in such case the pressure forces will be in compression on the concrete columns.

In FIGURE 10A the crane outrigger housings 460, 465 and 468, are disposed at distances corresponding to the floor level spacings in the building. The crane platform 420 thus receives its support from the three different sets of cross beams, in the case of metal structure, or from three different sets of vertical columns where reinforced concrete columns are utilized. The support in concrete structures may be obtained also in other ways, which will be described in more detail below.

For simplicity of illustration, the outrigger beams are shown as being directly supported on the respective top supporting surfaces of the girders. It is realized that certain variations to the extent of a fraction of an inch may exist, and that the floor level spacings for supporting those outrigger beams may not always be of exactly the same distance. It is to be noted that in such cases, any variations will be taken up by plates of various thicknesses that will serve as shims in order to establish proper seating of the outriggers, and also to place the crane platform supporting structure in appropriate horizontal position, to avoid any initial tilting angle in the crane base that would be undesirable.

As may be seen upon reference to FIGURES 9 and 10, the relative movement between the cage and the crane platform, previously discussed, may be readily achieved, since the outrigger beams from those two structures are so positioned that no interference can occur.

A further important feature of this invention is the disposition of the cage structure and the counter-weight to anchor and stabilize the supporting structure for the crane.

The manner in which that is achieved may be seen upon reference to FIGURES 10, 11 and 12. As shown in the plan view in FIGURE 11, the structure of the cage 425 surrounds and frames the dimensional outline of the crane support platform 420. The top frame of the cage 425, as shown in FIGURES 11 and 12, is provided with four lugs 480-1 to 480-4 which individually support adjustable threaded screws 485-1 to 485-4 which may be adjustably positioned against shim plates 487, if necessary, that rest on the upper surface 488 of the crane platform supporting structure generally represented as 420.

Once the crane platform structure 420 has been adjusted for support on the appropriate supporting beams and girders at the three different floor levels, as in FIGURES 10A and 10B, the cage may then be lowered in the manner previously described, by means of the cable drum assemblies, to lower the cage 425 to the position indicated in FIGURE 10A, and implied in FIGURES 11 and 12, at which the total weight of the cage will rest and press on the upper surface 488 of the crane platform supporting structure 420, without or with shims, as may be appropriate.

The total weight of the cage 425, and the counterweight 380 at the bottom of the cage, then serve as pressure elements operative in the manner indicated in FIGURES 11 and 12, to press downward on the corners of the crane-supporting platform structure 420. These weight-pressure forces with their respective moment arms provide substantial counterweight balancing forces to hold the crane platform stabilized in its proper horizontal position at all positions of the boom 480.

Instead of, or in addition to, relying solely upon the weight of the cage structure 425 to press upon the four corners of the crane platform structure 420, as indicated in FIGURES 10, 11 and 12, the cage 425 may also be locked to the structural framework, as may be better seen upon reference to FIGURES 9 and 10B.

As shown in FIGURE 9, the outrigger beams of the 205-series, and their outboard housings 345 and 350, rest on the top surfaces of two girders of the framework 220. The two cage housings 305A and 305B and their supported outriggers 310A and B and 312A and B are then moved upward with the cage 25 to press the outriggers 310A and B, and 312A and B upward against the lower surfaces of the two girders of framework 220.

As shown in FIGURES 10A and 10B, the cage 425 embodies three sets of outrigger beam housings 441, 442 and 443 at the front and rear of the cage, of which only those at the front of the cage in FIGURE 10B are shown. A similar set, not shown, is provided on the rear of the cage structure 425.

Each of those outrigger housings 441, 442 and 443 including also those at the rear of the cage, accommodates a pair of outrigger beams which may be extended sufficiently to rest on the cross beams or to engage the under surfaces of the cross beams, such as are presently shown supporting the outrigger beams for the crane-support structure. The cage outriggers will be used to support the cage, when, as previously explained, the crane is to be moved upward or downward to a desired level, at which the crane outriggers may then be disposed on the appropriate cross beams for support. The cage may then be moved by means of the cable drum assemblies to the position desired for the cage.

Thus, for example, when the cage is to be locked to the building structure, the outrigger beams 441A and 441B, FIGURE 10B bottom, may be extended from the housing 441, at the front of the cage of FIGURE 10B, and also from the corresponding housing at the rear of the cage 425, to place those outrigger beams against the under surfaces of the cross beams extending backwardly from the vertical columns 430 and 430A seen in FIGURE 10B. Once the cantilever beams 441A and 441B are engaged against the under surfaces of those cross beams, the threaded pressure screws 485-1 to 485-4, of FIGURES 11 and 12, are screwed down tightly, with appropriate shim plates 487, to the extent necessary, thereby locking the cage to the supporting structure of the building and at the same time locking the cage in position to press down against the crane supporting-structure 420 as shown in FIGURE 10A. The crane is thus essentially anchored to, and supported by, the entire building structure.

Before proceeding to a further explanation and description of the modifications employed in the concrete building structures, to accommodate the elevator crane of this invention, reference will be made to two other important features of the invention which may be seen upon reference to FIGURE 10A.

Another important feature of this invention is the construction of the crane boom 480 which provides an inherent fall-away force that will enable the boom to move automatically through a small starting angle from exact vertical position, without external motive means.

One of the problems encountered in conventional cranes is the lowering of a boom from an exact vertical position. Conventional booms are generally symmetrical with the center of gravity on the longitudinal central axis. In order to initiate movement of the boom from such vertical position, it would be necessary to have some auxiliary power device. For that reason, a conventional boom is ordinarily not raised to a true vertical position, but, instead, its maximum lift and rest position is somewhat short of true vertical.

In using the apparatus of the present invention, it is desirable to raise and hold the boom in true vertical position, since the boom may be assembled in sections and gradually raised and elevated in the air shaft within which the elevator crane is to operate. At the same time, it is desirable to avoid the need of auxiliary motive equipment for angularly driving the boom from a vertical position to a fall-away working position.

In accordance with the invention, as shown in FIGURE 10A, the boom 480 is constructed so the longitudinal axis of the boom 480 through its pivot pin 502 at the heel of the boom will be disposed slightly off and behind the center of gravity line 505 through the center of gravity 506 of the boom when the boom is in true vertical position. To further displace the center of gravity 506 forward on the boom, the head 507 of the boom is formed to extend slightly forward of the longitudinal axis 504 of the boom.

The slight moment arm between the longitudinal axis 504, of the boom, and the gravity center line 506, of the boom, when the boom is in true vertical position, is sufficient to provide a fall-away force that will cause the boom to move forwardly when a small amount of the hoist cable 508 is released, to permit a lowering movement of the boom.

A further important feature of the invention, in connection with the boom and its control, resides in the disposition and general arrangement of the gantry 510 relative to the heel pivot point 502 of the boom.

The gantry 510 comprises, generally, two rear anchor posts 512 and 514 with top bearings 516 and 518 for supporting a pivot shaft 520, on which is pivotally mounted a rocker arm assembly 522 for supporting the lower pulley block and sheaves 525 for the hoist cable 508. Two front gantry posts 532 and 534 are anchored on the rotatable platform 450 for the crane base, and those posts rise to a level that is higher than the location of the pivot bar 520 between the two rear vertical posts 512 and 514. Two side arms 536 and 538 extend from the two vertical rear posts 512 and 514 to the two vertical front ports 532 and 534 of the gantry, and together serve to support a horizontal limit bar 540 that serves to limit the downward angular movement of the radius arm structure 522 and the sheave block 525. The sheave block 525 carries a side-bracing lug 525A which determines the bottom limit position of the sheave block 525 against the limit bar 540 at the top level of the two front gantry posts 532 and 534.

As the boom 506 is lowered in a clockwise direction, as viewed in FIGURE 10A, the pulley block 525 will also be rotated clockwise in a lowering direction, until the block lug 525A engages the limit bar 540. Thereafter, the pulley sheave block 525 will remain at that limit position, notwithstanding any further lowering movement of the boom 480 and the top pulley block 525-2. Normally, the lowermost position of the boom 480 will be its horizontal position. Under those conditions, the hoist cable lines 508 which will extend in a direction towards the head end 507 of the boom 480 will be on a direction line as generally indicated by the dotted line 550. The tension on the cables along that direction line 550 will have an upward component at the head end of the boom that will tend to lift the head end of the boom with a force that will be approximately 3% of the line force along the direction line 550, in the case of a boom 100 feet in length and the front gantry post 504 about three (3) feet high. The tension in each cable itself as wound between the two pulley blocks will be a fraction of such line tension, according to the number of cable sections between the two pulley blocks 525 and 525-2.

The simple diagram in FIGURE 13 illustrates how the gantry post 504 maintains an angle with the boom 480 at the outer or head end 507 of the boom 480 to assure the presence of a force component, as indicated by the arrow 560, sufficient to raise the load attached to the outer or head end of the boom 480. The load indicated simply by the box 565 impliedly includes the gravity force on the boom itself.

The manner in which the apparatus embodying the present invention may be utilized in connection with the erection of a concerete-poured building may now be considered, as shown in more detail in FIGURES 14 to 16, inclusive.

In the previous figures where a steel framework was illustrated, the beams and girders of the steel framework were naturally adequate to support the cage and the crane platform structures on the building framework as conventionally erected.

In the case of concrete building structures, however, all the supports should be so arranged that the supporting concrete structures will be placed in compression rather than in tension. Also, such compression forces should be distributed over sufficient areas to prevent the development of excessive stress densities on and in the compressed concrete.

In order to avoid stress concentrations on the concrete and to assure a greater distribution of the pressure stresses on the concrete, metallic brackets or metallic sleeves are employed on and in the concrete wall structures, or vertical columns, to receive and distribute the relatively concentrated pressure of the outrigger beams. The metal brackets and sleeves are so supported on the concrete columns or in the concrete walls in such manner as to have a substantial area of contact with the concrete, whereby the total stress of the pressure on the brackets or on the sleeves may be distributed over a substantial area of the concrete, in order thereby to reduce the stress density to a safe value within the stress limit of the concrete.

The schematic view shown in FIGURE 14 is to show only the functional and schematic arrangement of the outrigger beams and their supporting housings that are related to the crane platform structure. The crane platform structure 620 embodies two main housings 625 and 630, one of which has two outrigger beams 625A and 625B, and the other of which has two outrigger beams 630A and 630B. The two beams 625A and 630A support a movable housing 635, which, in turn, supports two outrigger beams 635A and 635B.

Similarly, the other primary outrigger beams 625B and 630B are secured to and support a movable housing 640 at their outer ends. The housing 640 supports two outrigger beams 640A and 640B.

In order to illustrate the versatility of the invention, the two outrigger beams 635A and 640A are shown supported on separate brackets 645A and 645B, suitably supported on their respective columns 646A and 646B.

As shown in FIGURES 14 and 15, each bracket 645A and 645B consists of a back plate 648, a platform 650 with reinforcing top side walls 652, bottom side walls 653 and a front apron 654 to constitute a rigid box structure under the platform 650. The flat back wall 648 is provided with two openings 655 and 656 to permit two bolt shanks to be threaded through them for anchorage on the concrete column.

During the pouring of the concrete for the columns, two sleeves 662 and 664 are appropriately located in the poured concrete to be in proper position for mounting and supporting the bracket 645A or 645B when the concrete in the column hardens. Bolts 665 are then inserted through the holes 655 and 656 in the back plate 648 of the bracket and through the related steel sleeves 662 and 664. The end of the shank of each bolt is provided with a wedge slot 665A through which a wedge is temporarily driven to lock the bolts in place against casual displacement or removal.

As shown in FIGURES 14 and 15, the outrigger beams, for example, 640A and 640B are to be supported on the brackets such as 645B. To hold the outrigger beam 640A, for example, against casual or unwanted displacement, the beam 640A is anchored in place on the bracket 645B by a suitable locking bolt 668 which extends through the outrigger beam 640A and through an opening 669 in the platform of the bracket 645B. The end of the shank of this bolt 668 is also preferably provided with a wedge slot 668A for receiving a wedge pin to hold the bolt against displacement.

To take care of a situation where vertical concrete beams may be irregularly placed in a building, an auxiliary "jumping beam" may be utilized, such as the beam 670, shown at the right hand side of FIGURE 14, supported between the two brackets 645C and 645D.

The "jumping beam" 670 may be built up as a box structure, as shown in FIGURE 15, to provide greater rigidity against bending. The "jumping beam" 670 then provides the support for the outer ends of the outrigger beams 635B and 640B. Those outrigger beams may then be anchored to the "jumping beam" with suitable bolts 672 in a manner similar to that shown on the left hand side of FIGURE 14 where the beam is directly supported on the bracket platform.

In the process of erecting a concrete building, the space reserved for the elevators of the building provides an appropriate location for the elevator crane of this invention for its operation during such erection of the building.

The two side walls at the two sides of the elevator space provide appropriate support for the outrigger beams. However, in order that no interference may be encountered in the continuous pouring and hardening operations of the wall, as additional floors are added, appropriate metal sleeve or box structures are provided in the two walls during the pouring operations so those box structures will be available as metallic supports for the outrigger beams of the cage and of the crane support. The disposition of the box sleeves in those walls will be similar to the disposition of the metallic sleeves shown in the columns in FIGURES 14 and 15.

FIGURE 16 shows, esssentially schematically, the disposition of an elevator-and-crane assembly 700 in accordance with the principles of this invention, disposed in the space 705 of an elevator shaft in a concrete building as it is being erected. The two end walls 710 and 712 will be utilized to support the elevator-and-crane structure 700 as that combination elevator-crane structure is assembled, constructed and elevated, in accordance with the progressive elevation of the building structure.

The crane structure will be first on the ground at the base of the elevator space together with its lower supporting structural framework to provide as many as three separate sets of outrigger beams for three floor levels.

Similarly, the cage structure is assembled with all of the elements in place held together by bolts to permit easy assembly and disassembly.

In assembling the crane platform and the cage, various pulleys and power sheaves are assembled as shown in FIGURES 5, 6 and 7. As the pouring of the floor and walls in the concrete structure progresses, sleeve box structures 715 are disposed in the concrete as it is being poured, so the boxes will be in appropriate positions to receive the outrigger beams from the crane platform and from the cage structure when those beams from the respective structures are extended into the sleeve boxes 715 for support.

From the previous explanation of the manner in which the crane platform and the cage are selectively respectively positioned while the other is moved to a selected position, it will be clear that the crane and its related supporting apparatus and operating equipment can be transported directly into the space of the elevator shaft 705, and there assembled for operation on the ground during the pouring of the first three or four floors and the walls to the corresponding levels.

The crane structure 720 as shown in FIGURE 16 will be assembled as generally indicated with appropriate beams and connecting struts and tension plates or rods with suitable bolts to provide the structural arrangement 720 as shown. Actual details of design need not be enlarged upon, since such details will be a matter of knowledge to the erectors and operators of such structural assemblies.

Similarly, the cage structure 725 as schematically indicated may be constructed and assembled in accordance with the general mechanical principles indicated in FIGURE 16. The general arrangement and construction of the outrigger housings has already been shown in the previous figures and no further detail explanation is considered to be necessary now in connection with FIGURE 16. It is believed to be sufficient merely to indicate how the outrigger beams are supported within suitable sleeve and box supports appropriately disposed in the two end walls during the pouring and forming of those end walls.

As those walls harden sufficiently to provide the support for the crane and its working loads, and the cage, the elevator crane and cage may be progressively raised to enable the crane to serve progressively higher levels of the building.

By use of the box sleeves 715 anchored in the two end walls 710 and 712, even slight tipping of the crane platform will be limited by the outrigger beams.

The platform support for the crane, in FIGURE 16, may be rigidly anchored by the use of additional shim plates 716 in the anchor sleeves 715 to wedge the outrigger beams more tightly in those sleeves 715. Also, in the manner previously described in FIGURE 12, the cage itself may be lowered onto the crane platform, so the weight of the cage will aid in holding the platform stably anchored against tilting movement.

As shown in FIGURE 1 and FIGURE 16, a spring bias pressure-resistance plate 805 is located on the gantry structure to define a limit position for the boom 480 in the vertical position of the boom.

The pressure-reaction assembly 800 includes the pressure plate 805 biased forwardly by two springs 806 and 808 and held to a maximum forward position by a tension rod 810 and a cross bar 812 between the two front vertical posts of the gantry assembly.

Thus, in accordance with the principles of this invention, an efficient elevator crane combination has been disclosed which permits the crane and its cooperating elevating cage to be assembled in position where the crane is to operate, and in such manner that the building structure itself as it is progressively erected, will serve to support and stabilize the crane and its operating equipment during use. By means of the cooperating cage, the crane may be elevated as the building progresses to higher levels, by the very simple operation of elevating the crane to a higher level and then anchoring it in position, as may be appropriate, according to the nature of the building, that is, according to whether it is a steel structure or a poured concrete structure.

As an added feature, to provide maximum utilization of the boom, the high gantry has been disclosed which permits the boom to be lowered to a relatively low horizontal position, since the high gantry maintains, in combination with the cable sheaves, a lift line for the cables that will maintain an angle even at the lowermost position of the boom, so a lifting force will be available at the outer end of the boom without unduly stressing the pull cables.

As a further feature there has been disclosed an arrangement which permits the boom itself to be raised to a truly vertical position, which provides a substantial advantage in the use of the invention herein, since the crane and the boom must initially operate in relatively confined space limited by the dimensions of the intended elevator shaft. The provision of the eccentric support for the heel of the boom, with the construction of the boom generally such that the center of gravity of the boom is displaced from the vertical axis through such heel of the boom, and initial fall-away force for the boom is inherently built into the boom structure.

Modifications may be made in the detail construction of the cage and of the crane platform, depending upon the nature of the space available in the building and upon the type of building, within the spirit and scope of the invention and without departing from the spirit and scope of the claims.

What is claimed is:

1. A climbing support for a crane for use within a building framework of columns, beams and girders defining several floor levels at a vertical air shaft, such crane support comprising
    a vertical cage having a top level frame and a bottom level frame, and having external horizontal dimensions to permit the cage to fit movably within the spacings of the beams and the girders to enable the cage to move freely in a vertical path relative to said several floors defined by the beams and the girders and within the full height of the air shaft;
    a top cage housing structurally secured along each side end of the top level frame of said cage and open at the bottom for access to said housing;
    a bottom cage housing structurally secured along each side end of the bottom level frame and open at the top for access to said housing;
    shaft means supported in each said end housing;
    rotatable pulley means supported on each said shaft means within each said end housing;
    a platform to support and carry a crane, said platform being disposed horizontally within the cage, and having external horizontal dimensions to enable the cage to move freely in a vertical direction to a selected level relative to and within the cage;
    an upper platform housing structurally secured to the top of said platform along each side edge of said platform and aligned directly beneath the corresponding top housing along the respective side ends of said cage, each said upper platform housing being open at the top for access to said upper platform housing;
    shaft means supported in each said upper platform housing;
    rotatable pulley means supported on each said shaft means within each said top platform housing;
    a lower platform housing structurally secured to the bottom of said platform along each respective said side edge of said platform, each said lower platform housing being open at the bottom for access to said housing;
    shaft means supported in each said lower platform housing;
    rotatable pulley means supported on each said shaft means within each said lower platform housing;
    cable means including an upper cable having an upper cable end, and a lower cable having a lower cable end, with means anchoring said upper cable end to the cage adjacent said top level of the cage and means anchoring said lower cable end to the cage adjacent said lower level of the cage;
    rotatable drum means on said platform for selectively winding and accumulating said cables for controlling the relative vertical position of the platform within the cage, said upper cable being wound around said pulleys in said top cage housing and around said pulleys in said upper platform housing, and the lower end of said upper cable being suitably anchored to enable the winding operation of said rotatable drum means to be effective, and said lower cable being wound around said pulleys in said bottom cage housing and around said pulleys in said lower platform housing, and the upper end of said lower cable being suitably anchored to enable the winding operation of said winding means to be effective on said cable;
    and means for selectively anchoring either the cage or the platform to the building framework at a selected floor level to enable the rotatable drum means to change the relative position of the free platform or cage with respect to the anchored cage or platform.

2. A climbing support for a crane for use within a building framework of columns, beams and girders defining the floor levels at a vertical air shaft, such crane support comprising
    a cage to fit into said air shaft for free vertical movement to any desired level within said air shaft, said cage saving a top level and a bottom level and two spaced and horizontally disposed opposite housing structures at the top level and two at the bottom level, each containing cable pulley block means;
    a horizontal platform to fit into said cage for free vertical movement to any desired level within said cage, said platform having two spaced parallel housing structures horizontally disposed on and integral with said platform above platform level, and having two similar spaced parallel housing structures horizontally disposed on and integral with said platform under platform level, said platform housing structures and said cage housing structures being in vertical alignment;
    pulley means supported within each of said housing structures;
    cable means coupling top level pulley block means in said cage housings with above-platform level pulley block means, and cable means coupling bottom level pulley block means in said cage housings with below-platform level pulley block means;
    means supported on and secured to said platform for operating said cable means to control the relative positions of said cage and said platform;
    and means for anchoring either the cage or the platform to permit the relative position of the other to be varied.

3. A climbing elevator, as in claim 2, including direction-controlling means to serve to actuate the operating means on the platform to operate said cable means according to the direction in which the platform is to be moved relative to the cage, or vice versa.

4. A climbing crane support, as in claim 2, in which said cable means include spooling drum means for selectively spooling cable onto or unspooling cable from such drum means for shifting the position of the platform relative to the cage, or vice versa.

5. A climbing crane support, as in claim 2, in which said means for anchoring the cage or the platform includes outrigger means for selectively supporting either the cage or the platform in resting position on a pair of opposite beams or girders disposed at a selected level adjacent the air shaft.

6. A climbing crane support, as in claim 2, in which said cable means include two spooling drum sections oppositely effective, so one drum section will reel in while the other drum section will reel out.

7. A climbing elevator as a support, as in claim 2, in which
said cable means include spooling drums and cable lengths;
and said support means includes, further, one set of a plurality of pulleys supported on said cage and a second set of a plurality of pulleys supported on said platform, whereby said two sets of pulleys act as pulley blocks to enable a cable between them to provide multiplied lifting power between cage and platform.

8. An elevator comprising
a support cage having a generally vertical axis, and having a top and a bottom, and extensible and retractible outrigger means for supporting the cage on separate independent external outrigger support structures;
a movable platform disposed within said cage and co-axially movable upward or downward within said cage;
rotatable drum means in bearings anchored to said platform;
means to rotate the drum selectively in either direction;
a first cable having one end anchored on the drum and the other end anchored to the cage at its top level, with the cable arranged to be wound and accumulated on the drum means in a forward direction of rotation of the drum to raise the platform toward the top level of the support cage, and the cable arrangement being such that rotation of the drum in the reserve or backward direction will play-out the accumulated cable to permit the platform to move to a selected lower level within the support cage.

9. An elevator, as in claim 8, including
a second cable having one end anchored to the drum means and the other end anchored to the cage at its bottom level, with the cable arranged to be wound and accumulated on the drum means when said drum means rotates in a backward direction of rotation, whereby said cable will pull the platform and the lower level of the support cage toward each other.

10. An elevator, as in claim 9, in which the movable platform is provided with extensible and retractible outrigger means for supporting said platform on separate independent external outrigger support structures, whereby accumulation of said second cable means on said drum means when rotated in a backward direction of rotation will cause the pulling action of the cable to raise the lower end of the cage toward said platform, when said platform is supported on its outriggers and its outriggers suitably supported on external structural support members.

11. An elevator to support and raise a working crane progressively within a building structural framework of columns, beams and girders as such framework is being progressively erected, said elevator comprising
a cage dimensioned to fit for vertical movement within a space constituting an air shaft defined by surrounding girders, said cage consisting of a hollow framework having a top level frame and a bottom level frame around a generally vertical axis, and said cage framework having extensible and retractible outrigger means extensible from two opposite sides for supporting said cage on adjacent side girders of the building framework;
a movable platform movable co-axially within the cage and having extensible and retractible outrigger means, operative on the same sides as on said cage and operative when extended, to serve for supporting said platform on adjacent side girders of the building framework, and effective, when retracted, to be clear of said cage framework during movement of said platform;
drum means supported on and secured to the platform for selected rotation in a forward or in a backward direction;
power means for selectively rotating the drum in either selected direction;
first cable means connected between the drum means and the top frame of the cage for pulling the platform and said top frame of said cage toward each other when the said drum is rotated in forward direction;
second cable means connected between the drum means and the bottom frame of the cage for pulling the platform and said bottom frame of said cage toward each other when said drum is rotated in backward direction;
and switch means for controlling the power means to selectively rotate said drum means in either direction.

12. An elevator, as in claim 11, including, additionally,
a rotatable table on said platform;
means for removably and pivotally securing the lower end of a boom to said rotatable table;
and power means for controllably rotating the table to any desired position in azimuth to control the operating direction of a boom pivotally secured to said table.

13. A crane elevator for positioning a crane for operation at a selected level within a building framework as the framework is progressively erected, such elevator comprising
an open-work box-type cage structure with dimensions permitting the cage to be freely movable along a vertical axis within a vertical air shaft defined between girders within the building framework;
extensible and retractible cantilever beams supported on said cage and extensible to serve as outriggers to rest on selected girders of the building framework to support the cage at such selected level in the air shaft;
a platform structure disposed within the cage and movable coaxially within said cage;
and means for selectively raising or lowering said platform relative to said cage while maintaining the platform level.

14. A crane elevator, as in claim 13, in which said raising and lowering means include cable means between the cage and a plurality of support points effective on the platform.

15. A crane elevator, as in claim 14, including
cable block pulley means on the cage adjacent two opposite side edges and near each top corner of said cage;
cable block pulley means supported on the platform adjacent two side edges to be in vertical alignment with the cable block pulley means on said cage to guide a cable between said block pulleys;
a drum on the platform for winding and collecting the cable;
driving means;
coupling means between said driving means and said drum;
and means for guiding the cable between the block pulleys and the drum to place the cable regularly in side-by-side convolutions on the drum.

16. A crane elevator, as in claim 13, including
a turn table on said platform;
coupling means between said driving means and said turn table;
and means on said turn table for anchoring a crane boom on said turn table with a pivotal connection between the turn table and the bottom end of the crane boom.

17. Crane elevator apparatus for positioning a crane base for operation at a selected level within a building framework of concrete column and beam construction as the framework is progressively erected, such apparatus comprising
- support brackets anchored to the columns at preselected levels related to adjacent floor levels;
- a box-type cage structure with external dimensions to permit the cage to be freely movable along a vertical axis within a vertical air shaft defined between a group of concrete columns;
- and means for supporting said cage structure on appropriate ones of said support brackets on said columns at a selected level, said means including extensible and retractible cantilever beams supported on said cage and extensible from said cage to serve as outriggers to rest on said support brackets anchored to said columns.

18. Crane positioning apparatus, as in claim 17, including
- auxiliary spanning beam means for use between support brackets on wide-spread columns and serving to support extended outrigger cantilever beams projecting from said cage.

19. Crane elevator apparatus for positioning a crane base for operation within a vertical air shaft at a selected level within a building framework of concrete column and beam construction as the framework is progressively erected, such apparatus comprising
- a box-type cage structure with external dimensions to permit the cage to be freely movable along a vertical axis within said vertical air shaft defined between a group of concrete columns;
- elongated supporting housings anchored on two opposite sides of said cage, each of said housings having space to accommodate two separate extensible and retractible beams, and containing two beams to serve as outrigger supports for said cage, the beams being movable from each of said housings in opposite directions, and means fixed and anchored on appropriately positioned concrete columns adjacent said air shaft for receiving and supporting said outrigger supports.

20. Crane positioning apparatus, as in claim 19, in which
- a pair of spaced outrigger beams are extensible on each side of said cage from said anchored supporting housings;
- and the two outrigger beams of each such pair serve to support a housing movable with the pair of beams to extended projecting position and to retracted storing position, each such supported housing on each of said two opposite sides of the cage serving to accommodate and support a second pair of extensible and retractible outrigger cantilever beams.

21. Crane elevator apparatus for positioning a crane base for operation at a selected level within a building framework as the framework is progressively erected, such apparatus comprising
- a box-type cage structure with external dimensions to permit the cage to be freely movable along a vertical axis within a vertical air shaft defined between a group of columns;
- first and second elongated housings respectively anchored to the cage on two opposite sides of the cage;
- a first front movable beam storable in said first housing in retracted position, and projectable therefrom in a forward direction;
- a second front movable beam storable in said second housing in retracted position, and projectable therefrom in said forward direction;
- and means joining the forward ends of said front movable beams so those beams will move forward or backward as a paired couple to serve as a unitary outrigger support for distributing the weight of said apparatus over a supporting area.

22. Crane positioning apparatus as in claim 21, in which
- said means joining the forward ends of said front movable beams also includes
- auxiliary housing means for an auxiliary pair of cantilever outrigger beams;
- and a pair of such auxiliary cantilever outrigger beams retractible for storage in said auxiliary housing and projectable from said auxiliary housing for outrigger use.

23. Crane positioning apparatus, as in claim 19, including
- paired elongated housings on opposite sides of said cage at a plurality of levels.

24. Crane positioning apparatus, as in claim 20, including
- additional sets of anchored housings and outrigger beams which are provided for at least one additional level, to permit the cage to be supported from a plurality of floor levels.

25. Crane positioning apparatus as in claim 17, including, further,
- means on said cage for additionally supporting said cage at one or more additional selected levels, whereby the weight of the cage and the crane with its load may be distributed over several support brackets at several levels.

26. A crane and elevator for use within a building framework, said elevator comprising
- a cage disposed for vertical movement within a vertical spaceway in the building;
- a crane having a supporting structure dimensioned to fit within the cage and to be movable vertically relative to said cage, and having a boom pivoted on an upper surface of said structure;
- outriggers supported on said crane-supporting structure and extensible to rest on appropriate members of said building framework;
- a counterweight attached to the bottom of said cage;
- and means for resting said cage and said counterweight on said outriggers of the crane structure when said outriggers are extended and supported from the building framework, thereby to apply a counterweight balance force to the boom when the boom is lowered and loaded.

27. A crane and elevator, as in claim 26, having
- a gantry supported to extend above said upper surface on which the boom is pivoted, said gantry being disposed behind the boom pivot and having a head shaft at its top end;
- a tension post secured behind the gantry to said supporting structure;
- tie rods between the top of the tension post and the top of the gantry;
- a tension rod pivoted at one end to the top of the tension post and movable toward the gantry;
- a first sheave block supported on the outer end of the tension rod and embodying a seating bracket to seat against the head shaft on the top of the gantry when the boom is lowered to and below a predetermined angle above horizontal;
- a second sheave block connected to the outer end of the boom;
- a boom hoist cable wound between the two sheaves;
- and a winch for said boom hoist cable;
- the seating bracket on the first sheave block serving to seat on the top of the gantry to assure an angle between the boom and the hoist cable, as defined at the outer end of the boom, that will assure a lifting component at the outer end of the boom, even when the boom is lowered to horizontal position.

28. The method of operating a self-elevating crane on a metal structural framework for a building, in which the crane comprises a cage and a crane platform movable within the cage, with extensible and retractible outrigger beams supported respectively on the cage and on the platform, which method consists in anchoring the cage in selected position on the structural framework by appropriate outrigger beams, and then elevating or lowering the crane platform to a desired level from which to operate the crane, and then supporting the crane platform on appropriate parts of the building framework structure.

29. The method of claim 28 including the additional step of releasing the cage from the building framework structure and anchoring the cage to the crane platform for increased counterweight stability.

30. The method of operating a self-elevating crane in a concrete building structure having walls and floors, as the structure is being erected, in which the crane comprises a cage and a crane platform movable within the cage, with extensible and retractible outrigger beams supported respectively on the cage and on the platform, which method consists in disposing and anchoring metal boxes in the concrete walls as the concrete is poured, to have those boxes available to receive ends of outrigger beams after the concrete in said walls hardens; and then using those boxes to receive the ends of outrigger beams from the cage and from the crane platform, respectively, as needed, for supporting the crane platform and the cage respectively.

31. The method of operating a self-elevating crane, as in claim 30, including the additional steps of wedging and locking the outrigger beams into the supporting boxes.

32. In a self-elevating crane, having a cage and a relatively movable crane platform with extensible and retractible outrigger beams supported on the cage and on the platform, the method of operating the crane within a metal structural framework for a building with columns and girders, which method consists in supporting the crane platform on the top surfaces of structural girder members of the framework by outrigger beams of the crane platform;

bracing the cage upwardly against under surfaces of structural girder members of the framework by outrigger beams of the cage;

and pressing the cage downward on the platform.

References Cited by the Examiner

UNITED STATES PATENTS

| | | | |
|---|---|---|---|
| 1,788,451 | 1/1931 | Clapp | 212—64 |
| 1,965,367 | 7/1934 | Brown | 212—38 |
| 2,861,449 | 11/1958 | Cohan | 187—8.59 |
| 2,936,916 | 5/1960 | Dempster | 214—621 X |
| 2,957,582 | 10/1960 | Lusk | 182—144 X |
| 3,053,398 | 9/1962 | Liebherr et al. | 212—46 |

FOREIGN PATENTS

| | | |
|---|---|---|
| 473,789 | 10/1914 | France. |
| 1,062,850 | 12/1953 | France. |
| 1,076,799 | 4/1954 | France. |

SAMUEL F. COLEMAN, *Primary Examiner.*